(12) United States Patent
Hayata et al.

(10) Patent No.: US 9,315,600 B2
(45) Date of Patent: *Apr. 19, 2016

(54) METHOD FOR PRODUCING MODIFIED CONJUGATED DIENE POLYMER, MODIFIED CONJUGATED DIENE POLYMER, MODIFIED CONJUGATED DIENE POLYMER COMPOSITION, RUBBER COMPOSITION AND TIRE

(75) Inventors: Daisuke Hayata, Tokyo (JP); Chigusa Yamada, Tokyo (JP); Junichi Yoshida, Tokyo (JP); Takaaki Matsuda, Tokyo (JP); Yuichi Kitagawa, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 228 days.

This patent is subject to a terminal disclaimer.

(21) Appl. No.: 14/241,287

(22) PCT Filed: Aug. 22, 2012

(86) PCT No.: PCT/JP2012/071187
§ 371 (c)(1),
(2), (4) Date: Mar. 25, 2014

(87) PCT Pub. No.: WO2013/031599
PCT Pub. Date: Mar. 7, 2013

(65) Prior Publication Data
US 2014/0371383 A1    Dec. 18, 2014

(30) Foreign Application Priority Data

Aug. 26, 2011  (JP) ................................. 2011-184397
Oct. 18, 2011  (JP) ................................. 2011-229038

(51) Int. Cl.
| | | |
|---|---|---|
| C08F 36/06 | (2006.01) | |
| C08F 8/42 | (2006.01) | |
| C08K 3/36 | (2006.01) | |
| C08K 3/04 | (2006.01) | |
| B60C 1/00 | (2006.01) | |
| C08C 19/44 | (2006.01) | |

(52) U.S. Cl.
CPC ............... *C08F 36/06* (2013.01); *B60C 1/0016* (2013.04); *C08C 19/44* (2013.01); *C08F 8/42* (2013.01); *C08K 3/04* (2013.01); *C08K 3/36* (2013.01)

(58) Field of Classification Search
CPC ............. C08F 36/06; C08F 8/42; C08K 3/04; C08K 3/36
USPC ........ 526/173; 524/548, 555; 525/342, 328.2, 525/326.7
See application file for complete search history.

(56) References Cited

U.S. PATENT DOCUMENTS

| | | |
|---|---|---|
| 5,508,333 A | 4/1996 | Shimizu |
| 6,969,739 B1 | 11/2005 | Saito et al. |
| 2004/0254301 A1 | 12/2004 | Tsukimawashi et al. |
| 2005/0171276 A1 | 8/2005 | Matsuda et al. |
| 2006/0173138 A1 | 8/2006 | Hogan et al. |
| 2009/0203843 A1 | 8/2009 | Fukuoka et al. |
| 2009/0247696 A1 | 10/2009 | Fujii et al. |
| 2010/0056710 A1 | 3/2010 | Oshima |
| 2010/0099795 A1 | 4/2010 | Uesaka |
| 2011/0172344 A1 | 7/2011 | Yoshida et al. |
| 2013/0023624 A1 | 1/2013 | Sekikawa et al. |

FOREIGN PATENT DOCUMENTS

| | | | |
|---|---|---|---|
| AU | 3438768 A | 3/1978 | |
| CN | 1649907 A | 8/2005 | |
| EP | 2003146 A2 | 12/2008 | |
| JP | S53-119831 A | 10/1978 | |
| JP | S62-149708 A | 7/1987 | |
| JP | H07-233217 A | 9/1995 | |
| JP | H08-337614 A | 12/1996 | |
| JP | 2001-114938 A | 4/2001 | |
| JP | 2011-158834 A | 6/2001 | |
| JP | 2003-171418 A | 6/2003 | |
| JP | 2004-067987 A | 3/2004 | |
| JP | 2004-346140 A | 12/2004 | |
| JP | 2008-527150 A | 7/2008 | |
| JP | WO 2008123164 A1 * | 10/2008 | ............. C08C 19/12 |
| JP | 2009-263587 A | 11/2009 | |
| JP | 2009-287020 A | 12/2009 | |
| JP | 2010-077386 A | 4/2010 | |
| JP | 2010-077415 A | 4/2010 | |
| JP | 2010-116546 A | 5/2010 | |
| JP | 2010-168528 A | 8/2010 | |
| TW | 2010-26730 A1 | 7/2010 | |
| WO | 01/23467 A1 | 4/2001 | |
| WO | 2007/114203 A1 | 10/2007 | |
| WO | 2008/013090 A1 | 1/2008 | |
| WO | 2011/129425 A1 | 10/2011 | |

OTHER PUBLICATIONS

International Search Report issued in corresponding International Patent Application No. PCT/JP2012/071187 dated Nov. 13, 2012.

(Continued)

*Primary Examiner* — Bijan Ahvazi
*Assistant Examiner* — Ronald Grinsted
(74) *Attorney, Agent, or Firm* — Morgan, Lewis & Bockius LLP

(57) ABSTRACT

A method for producing a modified conjugated diene polymer comprising a polymerization step of obtaining a conjugated diene polymer containing a nitrogen atom in a polymer chain and an active end by copolymerizing a conjugated diene compound and a nitrogen atom-containing vinyl compound, or a conjugated diene compound, an aromatic vinyl compound and a nitrogen atom-containing vinyl compound by use of an alkali metal compound and/or an alkaline earth metal compound as a polymerization initiator, and a modification step of reacting a modifier.

20 Claims, No Drawings

(56) References Cited

OTHER PUBLICATIONS

International Preliminary Report on Patentability issued in corresponding International Patent Application No. PCT/JP2012/071187 dated Mar. 4, 2014.

Office Action issued on Apr. 17, 2014 for Taiwanese Application No. 101130702.

Extended European Search Report issued in related European Patent Application No. 12828753.9 dated Sep. 19, 2014.

* cited by examiner

METHOD FOR PRODUCING MODIFIED CONJUGATED DIENE POLYMER, MODIFIED CONJUGATED DIENE POLYMER, MODIFIED CONJUGATED DIENE POLYMER COMPOSITION, RUBBER COMPOSITION AND TIRE

TECHNICAL FIELD

The present invention relates to a method for producing a modified conjugated diene polymer, a modified conjugated diene polymer, a modified conjugated diene polymer composition, rubber composition and tire.

BACKGROUND ART

Recently, with a growth of demand for low-fuel consumption of automobiles, it has been desired to reduce rolling-resistance of tires. To satisfy the desire, it is demanded to develop a rubber material having lower exothermal properties (low hysteresis loss properties).

In the meantime, from the viewpoint of safety, it is demanded to develop a rubber material having not only excellent brake performance (wet skid resistance) on wet pavement but also excellent operation stability.

In addition, it is demanded to develop a rubber material having a good processability and providing a vulcanizate having a reinforcing effect with the help of a reinforcing filler and having excellent tensile properties, fuel saving properties and abrasion resistance.

When silica is used as the reinforcing filler in place of carbon black, which has conventionally been frequently used, a rubber composition excellent in balance between low hysteresis loss properties and wet skid resistance is known to be obtained.

However, the surface of silica is hydrophilic. Thus, when silica is used in combination with a highly hydrophobic diene rubber to prepare a composition, silica particles are mutually aggregated in the composition. As a result, good dispersibility of silica particles cannot be obtained. To overcome this problem, attempts have been made to enhance affinity for a silica surface by introducing a functional group interacting with the silica surface into a diene rubber, thereby improving dispersibility of silica in the composition and enhancing low hysteresis loss properties.

For example, Patent Literature 1 discloses a modified diene rubber obtained by reacting a modifier having a glycidylamino group with a polymer end. Patent Literature 2 discloses a modified diene rubber obtained by reacting glycidoxyalkoxysilane with a polymer end. Patent Literatures 3 to 6 each disclose a modified diene rubber obtained by reacting an alkoxysilane containing a nitrogen atom with a polymer end and a composition containing the modified diene rubber and silica. Patent Literature 7 discloses a modified diene rubber obtained by reacting a silicon atom-containing vinyl compound within a polymer chain and with an end thereof, and a composition containing the modified diene rubber and silica.

If a composition is prepared from a modified diene rubber according to any one of Patent Literatures 1 to 6 and silica and this composition or the composition according to Patent Literature 7 is vulcanized, a vulcanized rubber excellent in balance between low hysteresis loss properties and wet skid resistance can be obtained.

In the field of a rubber composition, various studies have conventionally been made on a method for modifying a butadiene polymer by introducing a functional group thereinto in order to improve affinity for a filler.

Examples of a specific method thereof include a method of introducing a functional group into an initiation end or termination end or into both of them by use of anion living polymerization (see, for example, Patent Literatures 8 to 10); a method of copolymerizing monomers having a functional group (see, for example, Patent Literature 11); and a method of introducing a functional group by reacting the functional group with a double bond of a main chain after polymerization (see, for example, Patent Literatures 12 and 13).

CITATION LIST

Patent Literature

Patent Literature 1: International Publication No. WO 01/23467
Patent Literature 2: Japanese Patent Laid-Open No. H07-233217
Patent Literature 3: Japanese Patent Laid-Open No. 2001-158834
Patent Literature 4: Japanese Patent Laid-Open No. 2003-171418
Patent Literature 5: National Publication of International Patent Application No. 2008-527150
Patent Literature 6: International Publication No. WO 07/114203
Patent Literature 7: Japanese Patent Laid-Open No. 2010-77415
Patent Literature 8: Japanese Patent Laid-Open No. S62-149708
Patent Literature 9: Japanese Patent Laid-Open No. 2003-171418
Patent Literature 10: International Publication No. WO 08/013090
Patent Literature 11: Japanese Patent Laid-Open No. 2010-077386
Patent Literature 12: Japanese Patent Laid-Open No. S53-119831
Patent Literature 13: Japanese Patent Laid-Open No. 2004-346140

SUMMARY OF INVENTION

Technical Problem

Although in the compositions proposed in Patent Literatures 1 to 6, dispersibility of silica is good, rigidity or dynamic modulus of elasticity is low. Thus, in some cases it is difficult to obtain both of dispersibility of silica and operation stability at the same time.

In the circumstances, it has been desired to develop a rubber composition improved in balance between low hysteresis loss properties and wet skid resistance while suppressing decrease in dynamic modulus of elasticity by improving dispersibility of silica and to develop a modified conjugated diene polymer to be contained in the composition.

In the method of modifying a butadiene polymer by introducing a functional group thereinto as described in Patent Literatures 8 to 13, it is expected to further improve affinity for a filler by increasing the amount of functional group to be introduced. However, when the amount of functional group is increased, the viscosity of a blend in blending a filler extremely increases and processability deteriorates. In addition to this problem, a problem is that even if an optimum functional group is found depending upon the type of a filler to be used, when two or more fillers are used, affinity improving effect sufficient for all fillers cannot be obtained.

In the circumstances, it is desired to develop a rubber composition having improved affinity for a filler and excellent dispersion effect as well as good processability and to develop a modified conjugated diene polymer to be contained in the composition.

The present invention was made in consideration of the above circumstances. A first object of the present invention is to provide a method for producing a modified conjugated diene polymer, which provides excellent balance between low hysteresis loss properties and wet skid resistance when made into a rubber composition containing silica and provides, because of its high dynamic modulus of elasticity, excellent operation stability when used as a rubber material for tire.

A second object of the present invention is to provide a method for producing a modified conjugated diene polymer which provides a vulcanizate having good affinity for a filler, excellent dispersibility simultaneously with excellent processability, good tensile properties, high strength and elongation properties, high fuel saving performance and excellent abrasion resistance.

Solution to Problem

The present inventors made intensive studies with a view to attaining the above objects. As a result, they found that the above objects can be attained by introducing a specific functional group into both the active end and the main chain of a conjugated diene polymer and accomplished the present invention.

The present invention is as follows.

[1] A method for producing a modified conjugated diene polymer comprising
a polymerization step of obtaining a conjugated diene polymer containing a nitrogen atom in a polymer chain and having an active end by copolymerizing a conjugated diene compound and a nitrogen atom-containing vinyl compound or a conjugated diene compound, an aromatic vinyl compound and a nitrogen atom-containing vinyl compound by use of an alkali metal compound and/or an alkaline earth metal compound as a polymerization initiator, and
a modification step of reacting a modifier, which is a compound represented by the following formula (1), with the active end of the conjugated diene polymer:

[Formula 1]

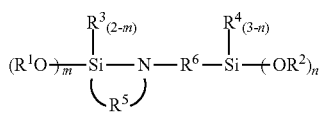

(1)

In the formula (1), $R^1$ to $R^4$ each independently represent an alkyl group having 1 to 20 carbon atoms or an aryl group having 6 to 20 carbon atoms; $R^5$ represents an alkylene group having 3 to 10 carbon atoms; $R^6$ represents an alkylene group having 1 to 20 carbon atoms; m is an integer of 1 or 2; and n is an integer of 2 or 3.

[2] The method for producing the modified conjugated diene polymer according to [1], wherein an amount of the the nitrogen atom-containing vinyl compound to be added is 0.5 to 100 moles based on 1 mole of the polymerization initiator.

[3] The method for producing the modified conjugated diene polymer according to [1] or [2], wherein the nitrogen atom-containing vinyl compound is a compound represented by the following formula (2) or (3):

[Formula 2]

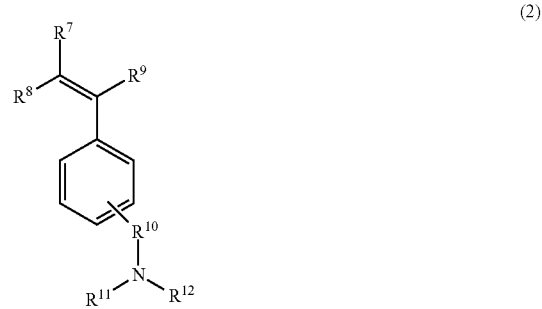

(2)

In the formula (2), $R^7$ to $R^9$ each independently represent hydrogen, an alkyl group having 1 to 20 carbon atoms or an aryl group having 6 to 20 carbon atoms; $R^{10}$ represents a single bond or a divalent hydrocarbon group having 1 to 6 carbon atoms, which may be interrupted by any of $NR^{13}$, O and S in the middle of the chain; and $R^{11}$ to $R^{13}$ each independently represent any selected from the group consisting of an alkyl group having 1 to 30 carbon atoms, an aryl group having 6 to 30 carbon atoms and a tri-substituted silyl group having an alkyl group having 1 to 30 carbon atoms and/or an aryl group having 6 to 30 carbon atoms on silicon:

[Formula 3]

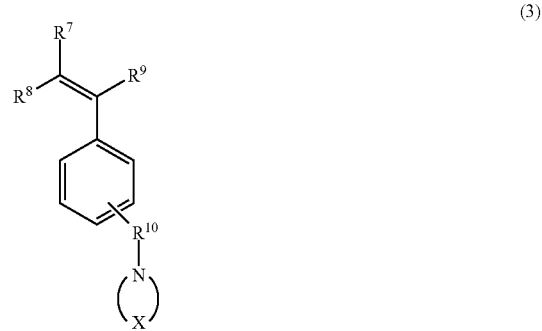

(3)

In the formula (3), $R^7$ to $R^{10}$ are the same as defined in the formula (2); X represents a divalent hydrocarbon group having 3 to 10 carbon atoms, which may be interrupted by any of $NR^{14}$, O and S in the middle of the chain and being a saturated ring forming portion in which all carbon-carbon bonds are single bonds or an unsaturated ring forming portion in which at least one of the carbon-carbon bonds is a double bond; and $R^{14}$ represents an alkyl group having 1 to 30 carbon atoms or an aryl group having 6 to 30 carbon atoms.

[4] The modified conjugated diene copolymer obtained by the method for producing the modified conjugated diene polymer according to any one of [1] to [3].

[5] A method for producing a modified conjugated diene polymer comprising
a polymerization step of obtaining a conjugated diene polymer having an active end by polymerizing a conjugated diene or copolymerizing a conjugated diene with a copolymerizable monomer by use of an alkali metal compound or an alkaline earth metal compound as a polymerization initiator, a modification step of modifying the active end by reacting a compound represented by the following formula (I) with the active end of the conjugated diene copolymer, and

[Formula 4]

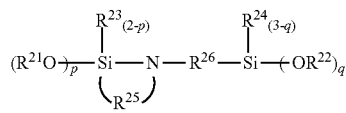

(I)

a step of modifying a vinyl group of the main chain of the conjugated diene polymer with a silicon modification group having at least one functional group selected from the group consisting of an amino group, an alkoxysilyl group and a hydroxy group by a hydrosilylation reaction.

In the formula (I), $R^{21}$ to $R^{24}$ each independently represent an alkyl group or aryl group having 1 to 20 carbon atoms; $R^{25}$ represents an alkylene group having 1 to 10 carbon atoms; $R^{26}$ represents an alkylene group having 1 to 20 carbon atoms; p is an integer of 1 or 2; and q is an integer of 2 or 3.

[6] The method for producing the modified conjugated diene polymer according to [5], wherein the step of modifying a vinyl group of the main chain is a step of reacting a hydrosilane compound having at least one functional group selected from the group consisting of an amino group, an alkoxysilyl group and a hydroxy group with the conjugated diene polymer in the presence of a catalyst, after the active end is modified.

[7] A modified conjugated diene polymer obtained by the production method according to [5] or [6], wherein a polystyrene-equivalent number average molecular weight (Mn) determined by gel permeation chromatographic (GPC) measurement is 20,000 to 2,000,000.

[8] A modified conjugated diene polymer having a nitrogen atom-containing functional group in the main chain of the polymer, and a functional group having at least one secondary amino group, at least one alkoxysilyl group, 3 to 6 branches on at least one of the ends.

[9] A modified conjugated diene polymer composition comprising 0.5 to 300 parts by mass of a silica inorganic filler based on 100 parts by mass of a rubber component comprising 20 parts by mass or more of the modified conjugated diene polymer according to any one of [4], [7] and [8].

[10] The modified conjugated diene polymer composition according to [9], comprising 5 to 200 parts by mass of the silica inorganic filler.

[11] A modified conjugated diene polymer composition comprising 5 to 200 parts by mass of a filler, which is silica and/or carbon black, based on 100 parts by mass of a rubber component comprising 20 parts by mass or more of the modified conjugated diene polymer according to any one of [4], [7] and [8].

[12] A rubber composition obtained by subjecting the modified conjugated diene polymer composition according to any one of [9] to [11] to crosslinking.

[13] A tire comprising the rubber composition according to [12].

Advantageous Effects of Invention

According to the present invention, it is possible to provide a method for producing a modified conjugated diene polymer providing a vulcanizate containing a silica inorganic filler, which is excellent in balance between low hysteresis loss properties and wet skid resistance, has high dynamic modulus of elasticity, and provides excellent operation stability when used as a rubber material for tire, and to provide such a modified conjugated diene polymer.

According to the present invention, it is also possible to provide a method for producing a modified conjugated diene polymer providing further excellent filler-dispersion effect and good processability when made into a crosslinked rubber composition containing a filler, compared to a modified conjugated diene polymer having a functional group introduced into a polymer end alone or the main chain alone. Owing to this, it is possible to obtain a rubber composition having a sufficient filler reinforcing effect, good tensile properties, high fuel saving properties and excellent abrasion resistance.

DESCRIPTION OF EMBODIMENTS

Now, an embodiment (hereinafter referred to simply as "the embodiment") for carrying out the present invention will be more specifically described below. The following embodiment is an illustration for describing the present invention and will not be construed as limiting the present invention to the following content. The present invention can be appropriately modified and carried out within the scope of the present invention.

In the first and second methods for producing a modified conjugated diene polymer according to the embodiment which will be described later, a modified conjugated diene polymer, which has a nitrogen atom-containing functional group in the main chain of the polymer, and a functional group having at least one secondary amino group, at least one alkoxysilyl group, and 3 to 6 branches on at least one of the ends is produced.

[First Method for Producing Modified Conjugated Diene Polymer]

The first method for producing a modified conjugated diene polymer according to the embodiment (hereinafter sometimes referred to simply as the first production method) has a polymerization step of obtaining a conjugated diene polymer containing a nitrogen atom in the main chain of the polymer and having an active end by copolymerizing a conjugated diene compound and a nitrogen atom-containing vinyl compound, or a conjugated diene compound, an aromatic vinyl compound and a nitrogen atom-containing vinyl compound, by use of an alkali metal compound and/or an alkaline earth metal compound as a polymerization initiator; and a modification step of reacting a modifier, which is a compound represented by the following formula (1), with the active end of the conjugated diene polymer:

[Formula 5]

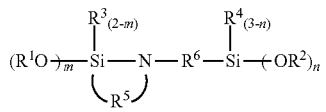

(1)

In the formula (1), $R^1$ to $R^4$ each independently represent an alkyl group having 1 to 20 carbon atoms or an aryl group having 6 to 20 carbon atoms; $R^5$ represents an alkylene group having 3 to 10 carbon atoms; $R^6$ represents an alkylene group having 1 to 20 carbon atoms; m is an integer of 1 or 2; and n is an integer of 2 or 3.

(Polymerization Step)

In the polymerization step, a conjugated diene polymer containing a nitrogen atom in the main chain of the polymer and having an active end is obtained by copolymerizing
a conjugated diene compound and a nitrogen atom-containing vinyl compound or
a conjugated diene compound, an aromatic vinyl compound and a nitrogen atom-containing vinyl compound
by use of an alkali metal compound and/or an alkaline earth metal compound as a polymerization initiator.

The conjugated diene polymer constituting a modified conjugated diene polymer is a copolymer of a conjugated diene compound and a nitrogen atom-containing vinyl compound or a copolymer of a conjugated diene compound, an aromatic vinyl compound and a nitrogen atom-containing vinyl compound.

<Conjugated Diene Compound>

The conjugated diene compound is not particularly limited, as long as it is a polymerizable monomer. Examples thereof include, but not limited to, 1,3-butadiene, isoprene, 2,3-dimethyl-1,3-butadiene, 1,3-pentadiene, 3-methyl-1,3-pentadiene, 1,3-heptadiene and 1,3-hexadiene. Of them, 1,3-butadiene and isoprene are preferable from the viewpoint of industrial availability. These may be used singly or in combinations of two or more.

<Aromatic Vinyl Compound>

The aromatic vinyl compound is not particularly limited as long as it is a monomer copolymerizable with a conjugated diene compound. Examples thereof include styrene, p-methylstyrene, α-methylstyrene, vinylethylbenzene, vinylxylene, vinylnaphthalene and diphenylethylene. Of them, styrene is preferable from the viewpoint of industrial availability. These may be used singly or in combinations of two or more.

<Nitrogen Atom-Containing Vinyl Compound>

The nitrogen atom-containing vinyl compound is not particularly limited as long as it is a nitrogen atom-containing vinyl compound and a monomer which can be polymerized by anion polymerization, for example, compounds represented by the following formulas (2) and (3) are preferable from the viewpoint of reactivity between a desired modified conjugated diene polymer and silica.

These may be used singly or in combinations of two or more.

[Formula 6]

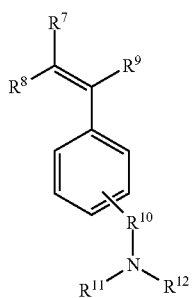

(2)

In the formula (2), $R^7$ to $R^9$ each independently represent hydrogen or an alkyl group having 1 to 20 carbon atoms or an aryl group having 6 to 20 carbon atoms; $R^{10}$ represents a single bond or a divalent hydrocarbon group having 1 to 6 carbon atoms, which may be interrupted in the middle of the chain by any one of $NR^{13}$, O and S; and $R^{11}$ to $R^{13}$ each independently represent any selected from the group consisting of an alkyl group having 1 to 30 carbon atoms, an aryl group having 6 to 30 carbon atoms and a tri-substituted silyl group having an alkyl group having 1 to 30 carbon atoms and/or an aryl group having 6 to 30 carbon atoms on silicon.

[Formula 7]

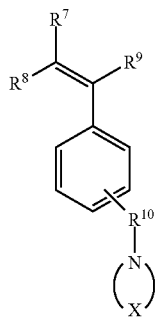

(3)

In the formula (3), $R^7$ to $R^{10}$ are the same as in the formula (2); X represents a divalent hydrocarbon group having 3 to 10 carbon atoms, which may be interrupted in the middle of the chain by any one of $NR^{14}$, O and S and that is a saturated ring forming portion in which all carbon-carbon bonds are single bonds or an unsaturated ring forming portion in which at least one of the carbon-carbon bonds is a double bond; and $R^{14}$ represents an alkyl group having 1 to 30 carbon atoms or an aryl group having 6 to 30 carbon atoms.

Examples of the compound represented by the formula (2) include, but not particularly limited to, N,N-dimethylvinylbenzylamine, N,N-diethylvinylbenzylamine, N,N-dipropylvinylbenzylamine, N,N-dibutylvinylbenzylamine, N,N-diphenylvinylbenzylamine, 2-dimethylaminoethylstyrene, 2-diethylaminoethylstyrene, 2-bis(trimethylsilyl)aminoethylstyrene, 1-(4-N,N-dimethylaminophenyl)-1-phenylethylene, N,N-dimethyl-2-(4-vinylbenzyloxy)ethylamine, $N^1$,$N^1$,$N^2$-trimethyl-$N^2$-(4-vinylbenzyl)ethane-1,2-diamine and N,N-dimethyl-2-((4-vinylbenzyl)thio)ethylamine. Of them, N,N-dimethylvinylbenzylamine is preferable from the viewpoint of balance among low hysteresis loss properties, wet skid resistance and dynamic modulus of elasticity of the vulcanizate to be prepared from the resulting copolymer with silica.

Examples of the compound represented by the formula (3) include, but not particularly limited to, 4-(2-pyrrolidinoethyl) styrene, 4-(2-piperidinoethyl)styrene, 4-(2-hexamethyleneiminoethyl)styrene, 4-(2-morpholinoethyl)styrene, 4-(2-thiazinoethyl)styrene, 4-(2-N-methylpiperazinoethyl)styrene, 1-((4-vinylphenoxy)methyl) pyrrolidine, 1-(4-vinylbenzyloxymethyl)pyrrolidine, 1-((4-vinylbenzyl)thiomethyl)pyrrolidine and N-methyl-1-(pyrrolidin-1-yl)-N-(4-vinylbenzyl)methylamine. Of them, 4-(2-pyrrolidinoethyl)styrene is preferable from the viewpoint of balance among low hysteresis loss properties, wet skid resistance and dynamic modulus of elasticity of the vulcanizate to be prepared from the resulting copolymer with silica.

In the step of polymerizing a conjugated diene polymer of the first production method, the amount of nitrogen atom-containing vinyl compound to be added is not particularly limited and can be regulated depending upon the purpose and the like. For example, the amount of nitrogen atom-containing vinyl compound to be added, although it is not particularly limited to the following, is preferably 0.5 to 100 moles, more preferably 1 to 20 moles and further preferably 2 to 10 moles based on 1 mole of a polymerization initiator described later.

If the amount of nitrogen atom-containing vinyl compound to be added in the polymerization step is 0.5 moles or more based on 1 mole of the polymerization initiator, a vulcanizate excellent in operation stability can be obtained.

In contrast, the amount of nitrogen atom-containing vinyl compound to be added is preferably 100 moles or less based on 1 mole of the polymerization initiator from the viewpoint of processability of the modified conjugated diene polymer composition to be prepared from the resulting conjugated diene copolymer with silica.

In the step of polymerizing a conjugated diene polymer of the first production method, the timing of adding the nitrogen atom-containing vinyl compound is not particularly limited. For example, the nitrogen atom-containing vinyl compound may be added simultaneously with a conjugated diene compound or with a conjugated diene compound and a vinyl aromatic compound; or may be divided and added in the middle of polymerization with a conjugated diene compound, or in the middle of copolymerization with a conjugated diene compound and a vinyl aromatic compound.

<Polymerization Initiator>

In the polymerization step of the first production method, an alkali metal compound and/or an alkaline earth metal compound are used as a polymerization initiator.

The organic alkali metal compound to be used as a polymerization initiator is not particularly limited. A mono-organic lithium compound is preferable.

Examples of the mono-organic lithium compound include, but not limited to, low molecular compounds, a soluble oligomer organic lithium compounds, and compounds having a carbon-lithium bond and compounds having a nitrogen-lithium bond in terms of binding between an organic group and lithium.

Examples of the carbon-lithium compound include, but not particularly limited to, n-butyllithium, sec-butyllithium, tert-butyllithium, n-hexyllithium, benzyllithium, phenyllithium and stilbenelithium.

Examples of the compound having a nitrogen-lithium bond include, but not particularly limited to, lithium dimethylamide, lithium diethylamide, lithium dipropylamide, lithium di-n-hexylamide, lithium diisopropylamide, lithium hexamethyleneimide, lithium pyrrolidide, lithium piperidide, lithium heptamethyleneimide and lithium morpholide.

Polymerization may be performed by use of a multifunctional organic lithium compound as a polymerization initiator other than the aforementioned mono-organic lithium compounds.

Examples of the multifunctional organic lithium compound include, but not particularly limited to, 1,4-dilithiobutane, a reaction product of sec-butyllithium and diisopropenylbenzene, 1,3,5-trilithiobenzene, a reaction product of n-butyllithium, 1,3-butadiene and divinylbenzene and a reaction product of n-butyllithium and a polyacetylene compound. In addition, known organic alkali metal compounds disclosed in the specifications of U.S. Pat. No. 5,708,092, British Patent No. 2,241,239 and U.S. Pat. No. 5,527,753 can be used.

As the organic lithium compound, n-butyllithium and sec-butyllithium are preferable from the viewpoint of industrial availability and controllability of a polymerization reaction.

These organic lithium compounds may be used singly or in combinations of two or more.

Examples of organic alkali metal compounds other than the organic lithium compounds include, but not particularly limited to, organic sodium compounds, organic potassium compounds, organic rubidium compounds and organic cesium compounds. Specific examples include sodium naphthalene and potassium naphthalene. Examples other than these include alkoxides, sulfonates, carbonates and amides of lithium, sodium and potassium. Furthermore, organic alkali metal compounds may be used in combination with other organic metal compounds.

Examples of the alkaline earth metal compound include, but not particularly limited to, organic magnesium compounds, organic calcium compounds and organic strontium compounds. Furthermore, alkoxides, sulfonates, carbonates and amides of alkaline earth metals may be used. These organic alkaline earth metal compounds may be used in combination with an alkali metal compound and other organic metal compounds.

<Polymerization Process>

It is preferable that the conjugated diene polymer obtained in the polymerization step of the first method for producing a modified conjugated diene polymer is a polymer having an active end obtained by a growth reaction such as an anion polymerization reaction using an alkali metal compound and/or alkaline earth metal compound as mentioned above as a polymerization initiator. Particularly, it is more preferable that the conjugated diene polymer is a polymer having an active end obtained by a growth reaction such as a living anion polymerization. Owing to this, a modified conjugated diene polymer having a high modification ratio can be obtained.

Although a polymerization process is not particularly limited, polymerization can be performed in a batch process and a continuous process. In the continuous process, one reactor or at least two reactors mutually connected can be used.

As the reactor, e.g., a vessel or tubular reactor equipped with a stirrer is used.

If an allene and an acetylene are contained in a conjugated diene compound as impurities, a modification reaction which will be described later may be inhibited. Thus, the total concentration (by mass) of these impurities contained is preferably 200 ppm or less, more preferably 100 ppm or less and further preferably 50 ppm or less. Examples of the allene include propadiene and 1,2-butadiene. Examples of the acetylene include ethyl acetylene and vinyl acetylene.

<Polymerization Solvent>

A polymerization reaction of a conjugated diene polymer is preferably performed in a solvent.

Examples of the solvent include solvents of a hydrocarbon such as a saturated hydrocarbon and an aromatic hydrocarbon. Specific examples thereof include, but not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon consisting of a mixture of these.

Before subjected to a polymerization reaction, impurities such as an allene and an acetylene are treated with an organic metal compound. This is preferable because a polymer having an active end tends to be obtained in a high concentration. In addition, a high modification ratio tends to be attained.

<Polar Compound>

In the polymerization reaction of a conjugated diene polymer, a polar compound may be added.

Random copolymerization of an aromatic vinyl compound, a conjugated diene compound and a nitrogen-containing vinyl compound can be made in the presence of the polar compound, which can also be used as a vinylation agent for controlling a microstructure of a conjugated diene moiety as well as is effective in accelerating e.g., a polymerization reaction.

Examples of the polar compound that can be used include, but not particularly limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene and 2,2-bis(2-oxoranyl)propane; tertiary amine compounds such as tetramethylethylenediamine, dipiperidinoethane, trimethylamine, triethylamine, pyridine and quinuclidine; alkali metal alkoxide compounds such as potassium-tert-amylate, potassium-tert-butyrate, sodium-tert-butyrate and sodium amylate; and phosphine compounds such as triphenylphosphine.

These polar compounds may be used singly or in combinations of two or more.

The amount of polar compound to be used is not particularly limited and can be selected depending upon the purpose and the like. Specifically, the amount to be used based on 1 mole of a polymerization initiator is preferably 0.01 to 100 moles. Such a polar compound (vinylation agent) can be used in an appropriate amount as a regulator for a microstructure of a conjugated diene moiety of a polymer depending upon a desired amount of vinyl linkage. Many polar compounds also have a randomizing effect effective in copolymerization of a conjugated diene compound and an aromatic vinyl compound, and can be used for adjusting distribution of an aromatic vinyl compound and used as an agent for adjusting the amount of styrene block. As a method for performing random polymerization of a conjugated diene compound, an aromatic vinyl compound and a nitrogen atom-containing vinyl compound, for example, a method of initiating a copolymerization reaction between whole amounts of styrene and nitrogen atom-containing vinyl compound and part of 1,3-butadiene, followed by adding the remaining 1,3-butadiene intermittently in the middle of the copolymerization reaction may be used.

<Polymerization Temperature>

The polymerization temperature employed in the polymerization step of the first production method is not particularly limited as long as a living anion polymerization proceeds at the temperature. From the viewpoint of productivity, the polymerization temperature is preferably 0° C. or more. From the viewpoint of ensuring the amount of modifier to be reacted with an active end after completion of the polymerization, the polymerization temperature is preferably 120° C. or less.

Furthermore, from the viewpoint of preventing cold flow of the conjugated diene polymer obtained in the polymerization step, a multifunctional aromatic vinyl compound such as divinylbenzene for controlling branching may be used.

<Structure of Conjugated Diene Polymer>

The amount of bound conjugated diene in the conjugated diene polymer obtained in the polymerization step of the first production method is not particularly limited. The amount is preferably 50 to 100 mass % and more preferably 60 to 80 mass %.

Furthermore, the amount of bound aromatic vinyl in the conjugated diene polymer is not particularly limited. The amount is preferably 0 to 50 mass % and more preferably 20 to 40 mass %.

If the amount of bound conjugated diene and the amount of bound aromatic vinyl fall within the above ranges, a vulcanizate having further excellent balance between low hysteresis loss properties and wet skid resistance and satisfactory operation stability can be obtained.

Herein, the amount of bound aromatic vinyl can be determined by ultraviolet absorption of a phenyl group.

The amount of vinyl linkage in the conjugated diene binding units is not particularly limited. It is preferably 10 to 75 mole % and more preferably 25 to 65 mole %. When the amount of vinyl linkage falls within the above range, a vulcanizate having further excellent balance between low hysteresis loss properties and wet skid resistance and satisfactory operation stability can be obtained.

Herein, when the conjugated diene polymer is a copolymer of butadiene, styrene and a nitrogen atom-containing vinyl compound, the amount of vinyl linkage (amount of 1,2-bonding) in a butadiene binding unit can be obtained by the Hampton's method (R. R. Hampton, Analytical Chemistry, 21, 923 (1949)).

The conjugated diene polymer may be a random copolymer and a block copolymer.

Examples of the composition distribution of individual monomers in a random copolymer chain include, but not particularly limited to, a completely random copolymer the composition of which is close to a statistically random composition and a tapered (gradient) random copolymer having a tapered composition distribution. However, from the viewpoint of e.g., hysteresis loss properties, the composition distribution of a nitrogen atom-containing vinyl compound is preferably random. In the case of the microstructure of a conjugated diene such as 1,4-bonding and 1,2-bonding, a composition distribution may be uniform or nonuniform.

Examples of the block copolymer include a diblock copolymer (diblock) formed of two blocks, a triblock copolymer (triblock) formed of three blocks, and a tetrablock copolymer (tetrablock) formed of four blocks. Assuming that a block consisting of an aromatic vinyl compound such as styrene is represented by, for example, "S" and a block consisting of a conjugated diene compound such as butadiene or isoprene is represented by "B" block copolymers may be expressed as an S-B diblock copolymer, an S-B-S triblock copolymer and an S-B-S-B tetrablock copolymer.

In the above formula, the composition of each block is not necessary to be uniform. For example, block B may be a copolymer of an aromatic vinyl compound and a conjugated diene compound or a copolymer of an aromatic vinyl compound and a nitrogen atom-containing vinyl compound, or alternatively, a copolymer of an aromatic vinyl compound, a conjugated diene compound and a nitrogen atom-containing vinyl compound.

Also in the above formula, it is not always necessary that the boarder of blocks is distinctive. For example, when block B is a copolymer of an aromatic vinyl compound and a conjugated diene compound, the aromatic vinyl compound in block B may be distributed uniformly or distributed in a tapered manner. Furthermore, in block B, a plurality of moieties where an aromatic vinyl compound is uniformly distributed and/or a plurality of moieties where an aromatic vinyl compound is distributed in a tapered manner may be present together. Furthermore, a plurality of segments different in content of an aromatic vinyl compound may be present together in block B. When a plurality of block S and a plurality of block B are present in a copolymer, constitutions such as molecular weights and compositions of them may be the same or different.

In the conjugated diene polymer obtained in the polymerization step, it is preferable that the number of chains consisting of nitrogen atom-containing vinyl compound units and/or aromatic vinyl compound units is low or zero. More specifically, it is preferable that the number of blocks having 30 or more chains consisting of these units is low or zero.

Specifically, in the case where the polymer is a butadiene-styrene-nitrogen atom-containing vinyl copolymer, the amount of polymer insoluble in methanol is analyzed by decomposing the polymer by a known method, i.e., the Kolthoff's method (method described in I. M. KOLTHOFF, et al., J. Polym. Sci. 1, 429 (1946)). In the known method, the proportion of a block consisting of 30 or more chains consisting of styrene and/or nitrogen atom-containing vinyl units is preferably 5 mass % or less and more preferably 3 mass % or less based on the total amount of the polymer.

(Step of Modifying Active End)

In the step of modifying an active end, a modifier, which is a compound represented by the following formula (1), is reacted with the active end of the conjugated diene polymer to obtain a modified conjugated diene polymer.

[Formula 8]

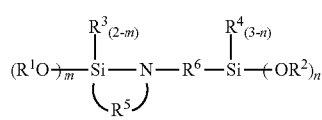
(1)

In the formula (1), $R^1$ to $R^4$ each independently represent an alkyl group having 1 to 20 carbon atoms or an aryl group having 6 to 20 carbon atoms; $R^5$ represents an alkylene group having 3 to 10 carbon atoms; $R^6$ represents an alkylene group having 1 to 20 carbon atoms; m is an integer of 1 or 2; and n is an integer of 2 or 3.

Examples of the modifier used in the step of modifying the active end of a conjugated diene polymer of the first production method include, but not limited to, cyclic azasilane compounds such as 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane and 2-ethoxy-2-ethyl-1-(3-diethoxyethylsilylpropyl)-1-aza-2-silacyclopentane.

Of them, from the viewpoint of reactivity and interaction between a functional group of a modifier and an inorganic filler such as silica and from the viewpoint of processability, a compound where m is 2 and n is 3 is preferable.

Preferable specific examples thereof include 2,2-dimethoxy-1-(3-trimethoxysilylpropyl)-1-aza-2-silacyclopentane and 2,2-diethoxy-1-(3-triethoxysilylpropyl)-1-aza-2-silacyclopentane.

The reaction temperature, reaction time and the like in reacting the aforementioned modifier with the active end of a polymer are not particularly limited. The reaction is preferably performed at 0 to 120° C. for 30 seconds or more.

The amount of aforementioned modifier to be added is not particularly limited. The amount to be added is preferably 0.12 to 0.6 moles based on 1 mole of the aforementioned polymerization initiator, more preferably 0.16 to 0.5 moles, and further preferably 0.16 to 0.4 moles.

In order for the resulting modified conjugated diene polymer to obtain a sufficient modification ratio, the amount to be added is preferably 0.12 moles or more. For improving processability, it is preferable that polymer ends are mutually coupled to obtain a branched polymer component. In considering this in combination with the cost of a modifier, the amount to be added is preferably 0.6 moles or less.

(Modified Conjugated Diene Polymer)

The modified conjugated diene polymer to be obtained in the first production method of the modified conjugated diene polymer mentioned above has a nitrogen atom-containing functional group in the polymer main-chain, and a functional group having at least one secondary amino group, at least one alkoxysilyl group, and 3 to 6 branches on at least one of the ends.

<Modification Ratio>

It is preferable that the modified conjugated diene polymer to be produced by the first production method mentioned above from the viewpoint of obtaining a better effect of the embodiment, has a modification ratio (hereinafter, sometimes referred to simply as the "modification ratio"), which is obtained by gel permeation chromatographic (GPC) measurement using a column charged with silica particles based on the amount of adsorption to the column, in other words, the proportion of a polymer having a functional group component of preferably 60 mass % or more, more preferably 80 mass % or more, further preferably 90 mass % or more.

Herein, the polymer having a functional group component refers to a polymer having a functional group component either in the main chain or in an end. Examples thereof include a polymer having a modification in the main chain alone, a polymer having a modification both in the main chain and in an end, and a polymer having a modification in an end alone.

More specifically, it is preferable that the modified conjugated diene polymer to be obtained in the embodiment preferably has a nitrogen atom-containing vinyl compound and a functional group derived from a modifier represented by the formula (1) in a molecule and has a modification ratio (which is obtained by gel permeation chromatographic (GPC) measurement using a column charged with silica particles based on the amount of adsorption to the column) of 60 mass % or more, more preferably 80 mass % or more, and further preferably 90 mass % or more.

The polymer having a functional group component can be quantitatively measured by chromatography, which can separate a functional group-containing modified component and a non-modified component.

Examples of the method using the chromatography include a quantification method using a GPC column charged with a polar substance, such as silica adsorbing a functional group component, as a filler. In this method, quantification can be made by comparison based on a non-adsorbable component used as an internal standard.

Specifically, the measurement method described in Examples which will be described later can be employed.

<Number Average Molecular Weight>

The polystyrene-equivalent number average molecular weight (Mn) of a modified conjugated diene polymer (obtained by the production method of the embodiment) obtained by gel permeation chromatographic (GPC) measurement is preferably 20,000 to 2,000,000, more preferably 100,000 to 1,000,000, further preferably 200,000 to 600,000 and still further preferably 300,000 to 500,000. The Mn is preferably equal to or more than the above lower limit value from the viewpoint of operation stability, and also preferably equal to or less than the above upper limit value from the viewpoint of processability. Furthermore, the ratio of the weight average molecular weight (Mw) to the number average molecular weight (Mn) (Mw/Mn) is preferably 1.00 to 3.50 and more preferably 1.10 to 3.00 from the viewpoint of physical properties of a vulcanizate.

(Other Treatment)

<Inactivator, Neutralizer>

The modified conjugated diene polymer to be obtained by the first production method of the embodiment is subjected to a modification reaction and thereafter, if necessary, an inactivator, a neutralizer or the like may be added to a solution of the modified conjugated diene polymer.

Examples of the inactivator include, but not particularly limited to, water; and alcohols such as methanol, ethanol and isopropanol. Examples of the neutralizer include, but not particularly limited to, carboxylic acids such as stearic acid, oleic acid and versatic acid (a mixture of carboxylic acids having 9 to 11, mainly 10, carbon atoms and many branches); an aqueous solution of inorganic acid; and carbonic acid gas.

<Hydrogenation Reaction>

In the embodiment, a modified conjugated diene polymer can be further hydrogenated in an inactive solvent to convert all or some of the double bonds of the polymer to saturated hydrocarbons. In this case, heat resistance and weather resistance are improved, and deterioration of a product in the case of processing at a high temperature can be prevented. As a result, the modified conjugated diene polymer can deliver further excellent performance in various uses including automobile use.

More specifically, the rate of hydrogenation of unsaturated double bonds (hereinafter sometimes referred to as the "hydrogenation rate") derived from a conjugated diene compound can be arbitrarily chosen depending upon the purpose and is not particularly limited.

When a modified conjugated diene compound is used as a vulcanized rubber, it is preferable that the double bonds of the conjugated diene moiety partially remain. From the viewpoint of this, the hydrogenation rate of the conjugated diene moiety of a modified conjugated diene polymer is preferably 3 to 70%, more preferably 5 to 65% and further preferably 10 to 60%.

Note that, when a monomer unit derived from an aromatic vinyl compound is contained in a modified conjugated diene polymer, the hydrogenation rate of an aromatic double bond derived from the aromatic vinyl compound is not particularly limited. The hydrogenation rate is preferably 50% or less, more preferably 30% or less and further preferably 20% or less. The hydrogenation rate can be obtained by e.g., a nuclear magnetic resonance apparatus (NMR).

The hydrogenation method is not particularly limited, and a known method can be used. Examples of a particularly suitable hydrogenation method include a method of blowing gaseous hydrogen into a polymer solution in the presence of a catalyst. Examples of the catalyst include a heterogeneous catalyst having a noble metal supported on a porous inorganic substance; and a homogeneous catalyst such as a catalyst obtained by solubilizing a salt of e.g., nickel and cobalt and reacting with e.g., organic aluminum, and a catalyst using a metallocene such as titanocene. Of them, a titanocene catalyst is particularly preferable since mild hydrogenation conditions can be selected. Furthermore, an aromatic group can be hydrogenated by use of a catalyst having a noble metal supported thereon.

Specific examples of the hydrogenation catalyst include (1) supported type heterogeneous hydrogenation catalysts having a metal such as Ni, Pt, Pd and Ru supported on carbon, silica, alumina, diatomaceous earth or the like; (2) so-called Ziegler type hydrogenation catalysts in which a salt of an organic acid of Ni, Co, Fe and Cr or a transition metal salt such as an acetyl acetone salt and a reducing agent such as organic aluminum are used; and (3) so-called organic metal complexes such as organic metal compounds of Ti, Ru, Rh and Zr. Known Hydrogenation catalysts as described, for example, in Japanese Patent Publication Nos. 42-8704, 43-6636, 63-4841, 1-37970, 1-53851 and 2-9041 and Japanese Patent Laid-Open No. 8-109219 can be used. Examples of a preferable hydrogenation catalyst include a reaction mixture of a titanocene compound and a reducible organic metal compound.

<Additives>

It is preferable that a rubber stabilizer is added to a modified conjugated diene polymer of the embodiment from the viewpoint of preventing generation of gel after polymerization and improving stability during processing.

The rubber stabilizer is not particularly limited and a known rubber stabilizer can be used. For example, antioxidants such as 2,6-di-tert-butyl-4-hydroxytoluene (BHT), n-octadecyl-3-(4'-hydroxy-3',5'-di-tert-butylphenol)propionate and 2-methyl-4,6-bis[(octylthio)methyl]phenol are preferable.

To remove or neutralize ionic substances, if necessary, additives can be added, which include water, an alcohol such as methanol, ethanol and isopropanol, carboxylic acids such as stearic acid, oleic acid, myristic acid, lauric acid, decanoic acid, citric acid and malic acid, an aqueous inorganic acid solution and carbonic acid gas.

To further improve processability of the modified conjugated diene polymer of the embodiment, if necessary, extender oil may be added to the modified conjugated diene copolymer. A method for adding extender oil to a modified conjugated diene polymer is not particularly limited. A method of adding extender oil to a polymer solution, mixing to obtain a solution of oil extended copolymer and removing a solvent is preferable. Examples of the extender oil include aroma oil, naphthene oil and paraffin oil. Of them, from the viewpoint of environmental safety and prevention of oil bleed and wet grip properties, an aroma oil substitute containing 3 mass % or less of a polycyclic aromatic (PCA) component by Method IP346 is preferable. Examples of the aroma oil substitute include TDAE (Treated Distillate Aromatic Extracts) and MES (Mild Extraction Solvate) shown in Kautschuk Gummi Kunststoffe 52 (12) 799 (1999) and RAE (Residual Aromatic Extracts). The amount of extender oil to be added is not particularly limited. The amount to be added is usually 10 to 60 parts by mass based on 100 parts by mass of the modified conjugated diene polymer and preferably 20 to 37.5 parts by mass.

<Method for Obtaining Modified Conjugated Diene Polymer>

As a method for obtaining a modified conjugated diene polymer from a polymer solution, a known method can be used. For example, a polymer is obtained by separating a solvent by e.g., steam stripping, obtaining the resulting polymer by filtration, and dehydrating and drying the polymer; or by concentrating a polymer solution in a flushing tank and vaporizing a solvent by a vent extruder or directly by e.g., a drum dryer.

[Second Method for Producing Modified Conjugated Diene Polymer]

The second method for producing a modified conjugated diene polymer according to the embodiment (hereinafter sometimes referred to simply as the second production method) includes a polymerization step of obtaining a conjugated diene polymer having an active end by polymerizing a conjugated diene or copolymerizing a conjugated diene with a copolymerizable monomer by use of an alkali metal compound or an alkaline earth metal compound as a polymerization initiator, a modification step of modifying the active end by reacting a compound represented by the following formula (I) with the active end of the conjugated diene copolymer, and

[Formula 9]

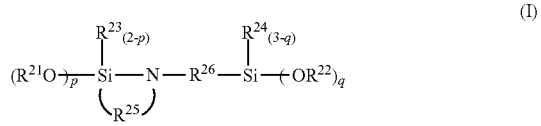

(I)

a modification step of modifying a vinyl group of the main chain of the conjugated diene polymer with a silicon modification group having at least one functional group selected from the group consisting of an amino group, an alkoxysilyl group and a hydroxy group by a hydrosilylation reaction.

Note that in the above formula (I), $R^{21}$ to $R^{24}$ each independently represent an alkyl group or aryl group having 1 to 20 carbon atoms; $R^{25}$ represents an alkylene group having 1 to 10 carbon atoms;

$R^{26}$ represents an alkylene group having 1 to 20 carbon atoms; p is an integer of 1 or 2; and q is an integer of 2 or 3.

Examples of the amino group include, other than unsubstituted amino groups, more specifically, amino groups represented by —$NH_2$, nitrogen atom-containing functional groups, such as monosubstituted amino groups represented by —NHR where R denotes a substituent, imino groups represented by —NH—, in which N binds to different carbons, disubstituted amino groups represented by —$NR_2$ where R denotes a substituent, imino groups in which N binds to the same carbon via a double bond, i.e., imino groups represented by =N—.

(Polymerization Step)

In the polymerization step, a conjugated diene polymer having an active end is obtained by polymerizing a conjugated diene or copolymerizing a conjugated diene with a copolymerizable monomer by use of an alkali metal compound or an alkaline earth metal compound as a polymerization initiator.

<Conjugated Diene Compound>

The conjugated diene compound is not particularly limited as long as it is a polymerizable monomer, for example, any one of the conjugated diene compounds used in the polymerization step of the first production method can be used. Particularly, 1,3-butadiene is preferable from the viewpoint of industrial availability.

<Monomer Copolymerizable with Conjugated Diene>

Example of the monomer copolymerizable with conjugated diene to be used in the polymerization step include, but not particularly limited to, conjugated diene compounds other than 1,3-butadiene, vinyl aromatic compounds, acrylonitriles and acrylic acid compounds.

In the case of copolymerization, one or two or more monomers of these are used.

Examples of a suitable copolymerizable monomer include aromatic vinyl compounds.

Examples of the aromatic vinyl compounds include styrene, α-methylstyrene, p-methylstyrene, p-ethylstyrene, divinylbenzene, 1,1-diphenylethylene, 1-vinylnaphthalene, 2-vinylnaphthalene, p-N,N-diethylaminomethylstyrene and p-N,N-diethyl-2-aminoethylstyrene.

Furthermore, examples of the preferable monomer include isoprene and styrene.

If 1,3-butadiene is used as the conjugated diene, examples of a preferable butadiene polymer include a polybutadiene, a butadiene-isoprene copolymer, a butadiene-styrene copolymer and a butadiene-isoprene-styrene copolymer. In the butadiene polymer, the content of a butadiene unit is preferably 50 to 100 mass %.

<Polymerization Initiator>

In the polymerization step, an alkali metal compound or an alkaline earth metal compound is used as a polymerization initiator.

As the alkali metal compound and alkaline earth metal compound, the same compounds as described in the polymerization step of the first method for producing a modified conjugated diene polymer can be used.

<Polymerization Solvent>

The polymerization reaction of a conjugated diene polymer is preferably performed in an inert solvent by solution polymerization.

As the polymerization solvent, the same solvents as described in the polymerization step of the first method for producing a modified conjugated diene polymer can be used.

<Polar Compound>

In the polymerization reaction of a conjugated diene polymer, a polar compound may be added.

As the polar compound, the same polar compounds as described in the polymerization step of the first method for producing a modified conjugated diene polymer can be used in the same amount to be added as described there.

<Polymerization Temperature>

The polymerization temperature is not particularly limited as long as living anion polymerization proceeds at the temperature. From the viewpoint of productivity, the temperature is preferably 0° C. or more. From the viewpoint of sufficiently ensuring the amount of modifier to be reacted with an active end after polymerization, the temperature is preferably 120° C. or less.

From the viewpoint of preventing cold flow of a conjugated diene polymer, a multifunctional aromatic vinyl compound such as divinylbenzene for controlling branching may be used.

<Polymerization Process>

Although a polymerization process is not particularly limited, polymerization can be performed in a batch process and a continuous process.

In the continuous process, one reactor or at least two reactors mutually connected can be used.

As a reactor, e.g., a vessel or tubular reactor equipped with a stirrer is used.

If an allene and an acetylene are contained in a conjugated diene compound as impurities, a modification reaction described later may be inhibited. Thus, it is preferable to reduce the total concentration (by mass) of these impurities contained in the same manner as described in the first method mentioned above.

<Structure of Conjugated Diene Polymer>

The amount of bound conjugated diene in the conjugated diene polymer obtained in the polymerization step of the second production method is not particularly limited. The amount is preferably 50 to 100 mass % and more preferably 60 to 80 mass %.

Furthermore, the amount of bound aromatic vinyl in a conjugated diene polymer is not particularly limited. The amount is preferably 0 to 50 mass % and more preferably 20 to 40 mass %.

If the amount of bound conjugated diene and the amount of bound aromatic vinyl fall within the above ranges, a vulcanizate having further excellent balance between low hysteresis loss properties and wet skid resistance and satisfactory operation stability can be obtained.

Herein, the amount of bound aromatic vinyl can be determined by ultraviolet absorption of a phenyl group.

The amount of vinyl linkage in a conjugated diene binding unit is not particularly limited. The amount of bonding is preferably 10 to 75 mole % and more preferably 25 to 65 mole %. When the amount of vinyl linkage falls within the above range, a vulcanizate having further excellent balance between low hysteresis loss properties and wet skid resistance and satisfactory operation stability can be obtained.

Herein, when the conjugated diene polymer is a copolymer of butadiene and styrene, the amount of vinyl linkage (amount of 1,2-bonding) in a butadiene binding unit can be obtained by the Hampton's method (R. R. Hampton, Analytical Chemistry, 21, 923 (1949)).

The conjugated diene polymer may be a random copolymer and a block copolymer.

Examples of the composition distribution of individual monomers in a random copolymer chain include, but not particularly limited to, a complete random copolymer the composition of which is close to a statistically random composition and a tapered (gradient) random copolymer having a tapered composition distribution. In the case of the microstructure of a conjugated diene such as 1,4-bonding and 1,2-bonding, a composition distribution may be uniform or non-uniform.

Examples of the block copolymer include a diblock copolymer (diblock) formed of two blocks, a triblock copolymer (triblock) formed of three blocks and a tetrablock copolymer (tetrablock) formed of four blocks. Assuming that a block consisting of an aromatic vinyl compound such as styrene is represented by, for example, "S" and a block consisting of a conjugated diene compound such as butadiene or isoprene is represented by "B" block copolymers may be expressed as an S-B diblock copolymer, an S-B-S triblock copolymer and an S-B-S-B tetrablock copolymer.

In the above formula, the composition of each block is not necessary to be uniform. For example, block B may be a copolymer of an aromatic vinyl compound and a conjugated diene compound.

Also, in the above formula, it is not always necessary that the boarder of blocks is distinctive. For example, when block B is a copolymer of an aromatic vinyl compound and a conjugated diene compound, the aromatic vinyl compound in block B may be distributed uniformly or distributed in a tapered manner. Furthermore, in block B, a plurality of moieties where an aromatic vinyl compound is uniformly distributed and/or a plurality of moieties where an aromatic vinyl compound is distributed in a tapered manner may be present together. Furthermore, a plurality of segments different in content of an aromatic vinyl compound may be present together in block B. When a plurality of block S and a plurality of block B are present in a copolymer, constitutions such as molecular weights and compositions of them may be the same or different.

In the conjugated diene polymer obtained in the polymerization step, it is preferable that the number of chains consisting of aromatic vinyl compound units is low or zero. More specifically, it is preferable that the number of blocks having 30 or more chains consisting of these units is low or zero.

Specifically, when a polymer is a butadiene-styrene copolymer, the polymer is decomposed to analyze the amount of a polymer insoluble in methanol by a known method, i.e., the Kolthoff's method (method described in I. M. KOLTHOFF, et al., J. Polym. Sci. 1, 429 (1946)). According to the known method, the proportion of a block consisting of 30 or more chains consisting of styrene units is preferably 5 mass % or less and more preferably 3 mass % or less based on the total amount of the polymer.

(Step of Modifying Active End)

In a step of modifying an active end, a modifier, which is a compound represented by the following formula (I), is reacted with the active end of the conjugated diene polymer to obtain a modified conjugated diene polymer.

[Formula 10]

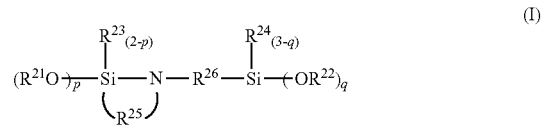

(I)

In the formula (I), $R^{21}$ to $R^{24}$ each independently represent an alkyl group or aryl group having 1 to 20 carbon atoms; $R^{25}$ represents an alkylene group having 1 to 10 carbon atoms;

$R^{26}$ represents an alkylene group having 1 to 20 carbon atoms; p is an integer of 1 or 2; and q is an integer of 2 or 3.

Note that $R^{21}$ to $R^{24}$ are each preferably an alkyl group and the number of carbon atoms thereof is preferably 1 to 10. The number of carbon atoms of the alkylene group of $R^{25}$ and $R^{26}$ is preferably 2 to 7 and more preferably 3 to 5.

As the modifier used in the step of modifying an active end of a conjugated diene polymer according to the second production method, the same modifiers as described in the first production method mentioned above can be used.

The reaction temperature, reaction time and the like in reacting the aforementioned modifier with the active end of a polymer are not particularly limited; however these may be the same as employed in the first production method mentioned above.

The amount of abovementioned modifier to be added is not particularly limited. The total number of moles of alkoxy groups bound to a silyl group in the modifier based on the number of moles of a polymerization initiator falls preferably within the range of 0.6 to 3 times, more preferably within the range of 0.8 to 2.5 times and further preferably within the range of 0.8 to 2 times. In order for the resulting modified conjugated diene polymer to obtain a sufficient modification ratio, the total number of moles is preferably 0.6 times or more. For improving processability, it is preferable that polymer ends are mutually coupled to obtain a branched polymer component. In considering this in combination with the cost of a modifier, the total number of moles is preferably 3 times or less.

In the step of modifying an active end, when the aforementioned polymerization step is performed by a batch process, a modification reaction may be sequentially performed in the reactor used in the polymerization step or by transferring the reaction solution to another reactor.

If the polymerization step is performed by a continuous process, a modification reaction is performed by transferring the reaction solution to another reactor.

The step of modifying an active end is preferably performed immediately after the polymerization step, and more preferably, the modification reaction is performed within 5 minutes by adding a modifier.

The reactor for the modification reaction is preferably a reactor in which sufficient stirring can be made. Specific examples thereof include a static mixer type reactor and a vessel reactor equipped with a stirrer.

(Step of Modifying Main Chain)

In the step of modifying a main chain, a vinyl group of the main chain of the conjugated diene polymer is modified with a silicon modification group having at least one functional group selected from the group consisting of an amino group, an alkoxysilyl group and a hydroxy group by a hydrosilylation reaction using a hydrosilane compound described later.

The hydrosilylation reaction is performed in an organic solvent solution or with a polymer alone (in the absence of a solvent) in a mixer, by reacting a hydrosilane compound having a functional group in the presence of a catalyst to modify the main chain of the conjugated diene polymer. Preferably, a polymer obtained after solution polymerization is further subjected to modification of a termination end and the resulting solution of the polymer is used as it is.

<Hydrosilane Compound>

In the hydrosilylation reaction in the step of modifying the main chain, a hydrosilane compound into which a silicon modification group having a functional group is to be introduced is not particularly limited as long as it is a hydrosilane compound having at least one functional group selected from an amino group, an alkoxysilyl group and a hydroxy group, preferably is a hydrosilane compound represented by a general formula $HSiR_{3-n}X_n$ where R represents a hydrocarbon group having 1 to 20 carbon atoms; X represents a hydrocarbon or organosilane compound group having at least one functional group selected from the group consisting of an amino group, an alkoxy group, an alkoxysilyl group and a hydroxy group; and n represents 1 to 3.

In the above general formula, it is preferable that n is 1 and R represents a hydrocarbon group having 1 to 3 carbon atoms. In this case, an effect, that is, a high yield of a hydrosilylation reaction, can be obtained.

The hydrosilane compound to be used in the step of modifying a main chain may produce an amino group, an alkoxy group and a hydroxy group by a reaction such as hydrolysis later performed.

Examples of the hydrosilane compound having an alkoxysilyl group include, but not particularly limited to, dimethylmonomethoxysilane, dimethylmonoethoxysilane, dimethylmonopropoxysilane, dimethylmonobutoxysilane, methyldimethoxysilane, methyldiethoxysilane, methyldipropoxysilane, ethyldiethoxysilane, trimethoxysilane, triethoxysilane, and an organosiloxane compound having a H—Si group and an alkoxysilyl group in a molecule.

Examples of the hydrosilane compound having an amino group include a hydrosilane compound having a disubstituted amino group, a hydrosilane compound having a protected monosubstituted amino group and a hydrosilane compound having a protected amino group.

Examples of the hydrosilane compound having a disubstituted amino group specifically include, but not limited to, dimethylaminodimethylsilane, diethylaminodimethylsilane and diethylaminodiethylsilane.

Examples of the hydrosilane compound having a protected monosubstituted amino group specifically include, but not limited to, N-methyl-N-trimethylsilylaminodimethylsilane and N-ethyl-N-trimethylsilylaminodiethylsilane.

Examples of the hydrosilane compound having a protected amino group specifically include, but not limited to, N,N-bistrimethylsilylaminodimethylsilane and N,N-bistrimethylsilylaminodiethylsilane.

Examples of the hydrosilane compound having a hydroxy group specifically include, but not limited to, dimethylhydroxysilane, diethylhydroxysilane and dibutylhydroxysilane. Furthermore, examples of the hydrosilane compound into which a silicon modification group having a hydroxy group is to be introduced by hydrolysis specifically include alkoxy silane compounds such as dimethylmonomethoxysilane, dimethylmonoethoxysilane, methyldimethoxysilane, trimethoxysilane and triethoxysilane; and silane compounds having an epoxy group such as dimethylglycidylsilane and diethylglycidylsilane.

The hydrosilylation reaction is performed in an organic solvent solution or a polymer alone (in the absence of a solvent) in a mixer, by reacting a hydrosilane compound having a functional group in the presence of a catalyst to modify the main chain of the conjugated diene polymer. Preferably, a polymer obtained after solution polymerization is further subjected to modification of a termination end and the resulting solution of the polymer is used as it is.

The amount of hydrosilane compound to be reacted varies depending upon the purpose, the amount is preferably 1 to 10 moles based on 1 mole of the main chain of the conjugated diene polymer.

If the modification of the main chain is performed within the range, the affinity of a desired modified conjugated diene polymer composition and its vulcanizate for a filler is improved and good processability can be obtained. More preferably, the amount of hydrosilane compound to be reacted with 1 mole of the main chain is 2 to 5 moles. In this case, the balance between affinity for a filler and processability becomes better.

As a catalyst for a hydrosilylation reaction, platinum or a platinum-containing catalyst is mainly used.

Preferably, a homogeneous platinum catalyst is suitably used. Examples thereof include, but not limited to, a chloroplatinic acid solution (i.e., Speier catalyst), a $Pt_2$(divinyltetramethyldisiloxane)$_3$ solution (e.g., Karstedt catalyst) and dichloro($\eta^4$-cyclo-1,5-diene)Pt (II).

The amount of platinum catalyst to be used in a reaction is preferably 0.01 to 10 mmol/mol per hydrosilane compound and more preferably 0.1 to 1 mmol/mol.

As another hydrosilylation catalyst, a metallocene compound containing any one of Ti, Zr, Hf, Ni, Co, Ru and Rh is used. In particular, a reaction product between a titanocene compound and an organic lithium or an organic aluminum may be used.

The hydrosilylation reaction is preferably performed within the temperature range of 20 to 150° C., and more preferably at 50 to 120° C. This range is practical because in this range a modification reaction of a main chain can be performed within appropriate reaction time and the occurrence of a side reaction such as gelatinization is less.

If a hydrosilylation reaction is performed following modification of the active end by use of the polymerization solution used in modification reaction of an end, the modification reaction of the main chain can be performed at the same temperature as that employed in modifying the active end and the polymerization temperature used in the polymerization step. The reaction time in a solution state is preferably 10 minutes to 5 hours and more preferably in the range of 30 minutes to 2 hours.

(Modified Conjugated Diene Polymer)

The modified conjugated diene polymer to be produced by the second method for producing a modified conjugated diene polymer according to the embodiment has a nitrogen atom-containing functional group in the main chain of the polymer and a functional group having at least one secondary amino group, at least one alkoxysilyl group, 3 to 6 branches on at least one of the ends.

<Modification Ratio>

It is preferable that the modified conjugated diene polymer to be produced by the second production method of the embodiment, from the viewpoint of obtaining a better effect of the embodiment, has a modification ratio (hereinafter, sometimes referred to simply as the "modification ratio"), which is obtained by gel permeation chromatographic (GPC) measurement using a column charged with silica particles based on the amount of adsorption to the column, in other words, a proportion of a polymer having a functional group component, of preferably 60 mass % or more, more preferably 80 mass % or more and further preferably 90 mass % or more.

Here, the polymer having a functional group component refers to a polymer having a functional group component either in the main chain or an end. Examples thereof include a polymer having a modification in the main chain alone, a polymer having a modification both in the main chain and in an end, and a polymer having a modification in an end alone.

More specifically, it is preferable that the modified conjugated diene polymer to be obtained in the embodiment has a modifier represented by the above formula (I) and a functional group derived from a hydrosilane compound involved in a hydrosilylation reaction within a molecule and has a modification ratio (which is obtained by gel permeation chromatographic (GPC) measurement using a column charged with silica particle based on the amount of adsorption to the column) of 60 mass % or more, more preferably 80 mass % or more and further preferably 90 mass % or more.

The polymer having a functional group component can be quantitatively measured by chromatography, which can separate a functional group-containing modified component and a non-modified component.

Examples of the method using the chromatography include a quantification method using a GPC column charged with a polar substance, such as silica adsorbing a functional group component, as a filler. In this method, quantification can be made by comparison based on a non-adsorbable component used as an internal standard.

Specifically, the measurement method described in Examples described later can be employed.

<Number Average Molecular Weight>

The modified conjugated diene polymer to be produced by the second method for producing a modified conjugated diene polymer of the embodiment has a polystyrene-equivalent number average molecular weight (Mn) obtained by gel permeation chromatography (GPC) measurement is preferably 20,000 to 2,000,000, more preferably 100,000 to 1,000,000, further preferably 200,000 to 600,000 and still further preferably 300,000 to 500,000, as with the modified conjugated diene polymer obtained by the first production method mentioned above.

From the viewpoint of operation stability, Mn is preferably equal to or more than the above lower limit value. From the viewpoint of processability, Mn is preferably equal to or less than the above limit value.

Furthermore, the ratio of the weight average molecular weight (Mw) to the number average molecular weight (Mn) (Mw/Mn) is preferably 1.00 to 3.50 and more preferably 1.10 to 3.00 from the viewpoint of physical properties of a vulcanizate.

(Other Treatment)

<Inactivator, Neutralizer>

As in the first production method mentioned above, an inactivator, a neutralizer or the like may be added as other treatment. As the inactivator and neutralizer, the same materials as in the first production method may be applied.

<Hydrogenation Reaction>

As in the first production method mentioned above, a modified conjugated diene polymer may be further hydrogenated in an inactive solvent.

<Additives>

Furthermore, as in the first production method mentioned above, if necessary, various type of additives may be blended.

<Method for Obtaining Polymer>

Also for finally obtaining the modified conjugated diene polymer, the same method as in the first production method mentioned above can be applied.

As described above, in the first and second methods for producing a modified conjugated diene polymer of the embodiment, a modified conjugated diene polymer, which has a nitrogen atom-containing functional group in the main chain of the polymer, a functional group having at least one secondary amino group, at least one alkoxysilyl group, and 3 to 6 branches on at least one of the ends, can be obtained.

By the presence of a functional group having at least one secondary amino group, at least one alkoxysilyl group, and 3 to 6 branches on at least one of the ends, an effect of reducing hysteresis loss and an effect of improving processability can be obtained. Furthermore, by the presence of the nitrogen atom-containing functional group in the main chain of the polymer, an effect of improving operation stability can be obtained.

(Modified Butadiene Polymer)

In the polymerization step of the second production method mentioned above, with respect to a modified butadiene polymer obtained by using particularly 1,3-butadiene as the conjugated diene, the amount of bound aromatic vinyl, the amount of vinyl linkage in a butadiene unit, glass transition temperature, the distribution of the amount of vinyl linkage in a butadiene unit, a combination of a functional group with the polymer end, method for controlling the distribution of the amount of vinyl linkage in a butadiene unit, suitable examples of a modified butadiene polymer, suitable polymer for use in tire, suitable polymer for use in footwear, addition of extender oil and Mooney viscosity will be described below.

<Amount of Bound Aromatic Vinyl>

In the case where the modified butadiene polymer to be obtained by the second production method mentioned above is a copolymer with a vinyl aromatic compound, the amount of bound aromatic vinyl, which is not particularly limited, is preferably 0 to 50 mass %. When the polymer is used particularly in tire tread, the amount of bound aromatic vinyl is more preferably 20 to 40 mass %.

If the amount of bound aromatic vinyl compound falls within the above range, a vulcanizate for use in tire tread having further excellent balance between low hysteresis loss properties and wet skid resistance, and satisfactory abrasion resistance and breaking strength can be obtained. Herein, the amount of bound aromatic vinyl can be determined by ultraviolet absorption of a phenyl group.

<Amount of Vinyl Linkage in Butadiene Unit>

The amount of vinyl linkage in a butadiene unit of the modified butadiene polymer to be obtained by the second production method mentioned above, which is not particularly limited, is preferably 10 to 80 mole % and more preferably 25 to 70 mole %.

If the amount of vinyl linkage falls within the above range, a vulcanizate for use in tire tread having further excellent balance between low hysteresis loss properties and wet skid resistance, and satisfactory abrasion resistance and breaking strength can be obtained.

Herein, when the modified conjugated diene polymer is a copolymer of butadiene and styrene, the amount of vinyl linkage (amount of 1,2-bonding) in a butadiene binding unit can be obtained by the Hampton's method (R. R. Hampton, Analytical Chemistry, 21, 923 (1949)).

<Glass Transition Temperature>

The glass transition temperature of the modified butadiene polymer to be obtained by the second production method mentioned above falls preferably within the range of −70° C. to 0° C. and more preferably within the range of −50° C. to −20° C. In this range, a vulcanizate for use in tire tread having further excellent balance between low hysteresis loss properties and wet skid resistance can be obtained.

The glass transition temperature can be obtained by recording a DSC curve while increasing the temperature within a predetermined range in accordance with ISO22768:2006, and determining a peak top (Inflection point) of a DSC differential curve as a glass transition temperature.

<Distribution of Amount of Vinyl Linkage in Butadiene Unit>

In the modified butadiene polymer to be obtained by the second production method mentioned above, the amount of vinyl linkage in a butadiene unit has a distribution along the main chain. When the polymer has such a constitution, a hydrosilylation reaction, which is a modification reaction of a main chain, frequently occurs on the side where the amount of vinyl is high, with the result that in the degree of modification of a functional group in the main chain a gradient is obtained within a desired range. Thereby, when the main chain modification is employed in combination with end modification, a wide variety of desirably modified structures can be obtained.

<Combination of Functional Group with Polymer End>

With respect to a combination of a functional group with an end particularly for modification, it is preferable that the modified butadiene polymer to be obtained by the second production method mentioned above has a structure where a specific functional group is added in large numbers to one end of a polymer molecule, where another specific functional group is added in large numbers to the other end.

Specifically, a disubstituted amino group is added to the polymerization initiation end; the amount of vinyl linkage in the main chain on the initiation end side is increased; the main chain on the initiation end side is modified with a disubstituted amino group; and an alkoxysilyl group is added to the polymerization termination end. Such a constitution is mentioned as a preferable example.

<Method for Controlling Distribution of Amount of Vinyl Linkage in Butadiene Unit>

As described in the above section <Distribution of amount of vinyl linkage in butadiene unit>, in the amount of vinyl linkage in a butadiene unit, a constitution where vinyl is distributed along the main chain is obtained by a method of changing temperature during polymerization.

The amount of vinyl linkage can be increased at low temperature, and decreased at high temperature. When polymerization is performed while increasing the temperature, the distribution of the amount of vinyl linkage in a butadiene unit can be controlled.

For example, assuming that polymerization is started at an initiation temperature of 30° C. and terminated at a final temperature as high as 90° C., and when the type and amount of vinylation agent are appropriately set, the amount of vinyl linkage can be sequentially changed from 70 mole % to 30 mole %.

As another method, when a vinylation agent is added or increased during polymerization, the amount of vinyl linkage can be changed from low to high. In this method, the amount of vinyl linkage can be continuously or stepwisely changed from 10 mole % to 80 mole %.

<Suitable Examples of Modified Butadiene Polymer>

In the case where the modified butadiene polymer to be obtained by the second production method mentioned above is a copolymer of 1,3-butadiene with another predetermined monomer, the resulting copolymer is preferably a butadiene-styrene copolymer.

The structure of the copolymer of a butadiene unit and a styrene unit may be random or block. The random structure may be a uniform random or nonuniform (tapered) random structure. The block structure may be complete block or tapered block partly containing a random structure. Random or block may be selected depending upon the purpose.

<Suitable Polymer for Use in Tire>

In the case where a vulcanizate-blending rubber composition using a composition of the modified butadiene polymer to be obtained by the second production method mentioned above is used in tire tread, the modified butadiene polymer is preferably a butadiene-styrene random copolymer. The modified butadiene polymer more preferably has a random structure and an amount of bound styrene of 3 to 50 mass %. In this case, even if deformation repeatedly occurs, the amount of heat generation is low. This property satisfies the performance required by a tire.

In this case, as a random copolymer, the content of a component consisting of 30 or more consecutive styrene units, in other words, a block styrene, is preferably low or zero.

Specifically, if a conjugated diene polymer is a butadiene-styrene random copolymer, when the amount of polystyrene (amount of block styrene) is measured by decomposing a branched conjugated diene polymer and analyzing the amount of block styrene insoluble in methanol by a known method, i.e., the Kolthoff's method (method described in I. M. Kolthoff, et al., J. Polym. Sci. 1, 429 (1946)), the amount of block styrene based on the total amount of the butadiene polymer is preferably 10 mass % or less and preferably 5 mass % or less.

More specifically when the modified butadiene polymer to be obtained by the second production method mentioned above is decomposed by an ozone decomposition method known as the Tanaka et al. method, and the distribution of a styrene chain is analyzed by GPC, it is preferable that the amount of isolated styrene, i.e., styrene having a chain consisting of one styrene unit, based on the total amount of bound styrene is 40 mass % or more and that the amount of a long block styrene chain, i.e., the amount of styrene having a chain consisting of 8 or more styrene units based on the total amount of bound styrene is 10 mass % or less.

In the aforementioned butadiene-styrene random copolymer for use in tire, the glass transition temperature measured by DSC (described in the above section <Glass transition temperature>) preferably falls within the range of −80° C. to 0° C. When the glass transition temperature falls within the above range, a composition having excellent tensile strength, low amount of heat generation to repeated distortion and excellent rubber elasticity can be obtained.

<Suitable Polymer for Footwear>

In the case where a vulcanization composition of the modified butadiene polymer to be obtained by the second production method mentioned above is used for footwear, the modified butadiene polymer preferably has a block structure. By virtue of the block structure, properties satisfying performance required by footwear, particularly by shoe sole, can be obtained. Particularly, high modulus value and hard feeling are obtained. It is preferable that a component having a chain of 30 or more styrene units is contained in a large amount. To describe more specifically, when a butadiene polymer is a butadiene-styrene random copolymer, the amount of block styrene based on the total amount of the butadiene polymer measured by the Kolthoff's method is preferably 10 mass % or more and more preferably 13 mass % or more.

<Oil Extension by Extender Oil>

The modified butadiene polymer to be obtained by the second production method mentioned above may be extended by extender oil. Examples of the extender oil include aroma oil, naphthene oil and paraffin oil. In addition, an aroma oil substitute containing 3 mass % or less of a polycyclic aromatic component (measured by the IP346 method) is preferable. In particular, it is more preferable to use an aroma oil substitute containing 3 mass % or less of a polycyclic aromatic component from the viewpoint of environmental safety and from the viewpoint of preventing oil bleed as well as wet grip properties.

Examples of the aroma oil substitute include TDAE, MES, SRAE and RAE described in Kautschuk Gummi Kunststoffe 52 (12) 799 (1999).

The amount of extender oil to be used is not limited, and usually preferably is 5 to 60 parts by mass based on 100 parts by mass of a butadiene polymer and more preferably 20 to 50 parts by mass.

<Mooney Viscosity>

The modified butadiene polymer to be obtained by the second production method mentioned above or the polymer extended by oil preferably has a Mooney viscosity at 100° C. of 30 to 100.

[Modified Conjugated Diene Polymer Composition]

Various modified conjugated diene polymer compositions are prepared from the modified conjugated diene polymers obtained by the first and second production methods mentioned above in combination with predetermined fillers.

Now, a first modified conjugated diene polymer composition and a second modified conjugated diene polymer composition will be described.

(First Modified Conjugated Diene Polymer Composition)

The first modified conjugated diene polymer composition contains 0.5 to 300 parts by mass of a silica inorganic filler based on 100 parts by mass of a rubber component comprising 20 parts by mass or more of the modified conjugated diene polymer (hereinafter sometimes referred to simply as the modified conjugated diene polymer) obtained by the first or second production method mentioned above, and preferably contains 5 to 200 parts by mass of the silica inorganic filler.

<Rubber Component>

The rubber component constituting the first modified conjugated diene polymer composition contains 20 parts by mass or more of the modified conjugated diene polymer based on 100 parts by mass of the rubber component. In addition, a rubber-like polymer other than the modified conjugated diene polymer can be used in combination.

The rubber-like polymers other than the modified conjugated diene polymer include, but not particularly limited to, conjugated diene polymers or hydrogenated products thereof, random copolymers of a conjugated diene compound and a vinyl aromatic compound or hydrogen additives thereof, block copolymers of a conjugated diene compound and a vinyl aromatic compound or hydrogen additives thereof, non-diene polymers and natural rubbers.

Specific examples thereof include butadiene rubbers or hydrogen additives thereof, isoprene rubbers or hydrogen additives thereof, styrene elastomers such as styrene-butadiene rubbers or hydrogen additives thereof, styrene-butadiene block copolymers or hydrogen additives thereof and styrene-isoprene block copolymers or hydrogen additive thereof, and acrylonitrile-butadiene rubbers or hydrogen additives thereof.

Examples of the non-diene polymers include, but not particularly limited to, olefin elastomers such as an ethylene-propylene rubber, an ethylene-propylene-diene rubber, an ethylene-butene-diene rubber, an ethylene-butene rubber, an ethylene-hexene rubber and an ethylene-octene rubber; butyl rubbers, brominated butyl rubbers, acryl rubbers, fluorine rubbers, silicone rubbers, chlorinated polyethylene rubbers, epichlorohydrin rubbers, $\alpha,\beta$-unsaturated nitrile-acrylic acid ester-conjugated diene copolymer rubbers, urethane rubbers and polysulfide rubbers.

The aforementioned rubber-like polymers may be modified rubbers obtained by adding a functional group having a polarity, such as a hydroxy group and an amino group.

The weight average molecular weight of each of the rubber-like polymers is preferably 2,000 to 2,000,000 and more preferably 5,000 to 1,500,000 from the viewpoint of the balance between performance and processability. Furthermore, a so-called liquid rubber having a low molecular weight can be used. These rubber-like polymers may be used singly or in combinations of two or more.

In the modified conjugated diene polymer composition containing the aforementioned rubber-like polymer, a blending ratio (mass ratio) of modified conjugated diene polymer/rubber-like polymer is preferably 20/80 to 100/0, more preferably 30/70 to 90/10 and further preferably 50/50 to 80/20.

Therefore, assuming that the entire rubber component including a rubber-like polymer is 100 parts by mass, the modified conjugated diene polymer obtained by the first or second production method is preferably contained in the rubber component in an amount of 20 to 100 parts by mass, more preferably 30 to 90 parts by mass and further preferably 50 to 80 parts by mass.

If the blending ratio of the modified conjugated diene polymer/rubber-like polymer falls within the above range, a vulcanizate having further excellent balance between low hysteresis loss properties and wet skid resistance and further satisfactory operation stability can be obtained.

<Silica Inorganic Filler>

As the silica inorganic filler, which is not particularly limited, a known filler can be used. A solid particle containing $SiO_2$ or $Si_3Al$ as a constitutional unit is preferable. It is more preferable that $SiO_2$ or $Si_3Al$ is contained as a main component of a constitutional unit. Herein, the main component refers to a component contained in a silica inorganic filler in an amount of 50 mass % or more, preferably 70 mass % or more and more preferably 80 mass % or more.

Specific examples of the silica inorganic filler include silica, clay, talc, mica, diatomaceous earth, wollastonite, montmorillonite, zeolite and inorganic fibrous substances such as glass fiber. Furthermore, a surface-hydrophobized silica inorganic filler and a mixture of a silica inorganic filler and an inorganic filler other than the silica inorganic filler can be used. Of them, from the viewpoint of e.g., strength and abrasion resistance, silica and glass fiber are preferable and silica is more preferable. Examples of the silica include dry silica, wet silica and synthesized silicate (silica). Of them, wet silica is preferable from the viewpoint of the excellent balance between low hysteresis loss properties and wet skid resistance.

In the modified conjugated diene polymer composition, from the viewpoint of obtaining practically good abrasion resistance and breakage characteristics, the nitrogen adsorption specific surface area of a silica inorganic filler obtained by BET adsorption method is preferably 100 to 300 $m^2/g$ and more preferably 170 to 250 $m^2/g$.

Furthermore, if necessary, a silica inorganic filler having a relatively small specific surface area (for example, specific surface area is 200 $m^2/g$ or less) can be used in combination with a silica inorganic filler having a relatively large specific surface area (for example, 200 $m^2/g$ or more). By virtue of this, good low hysteresis loss properties can be highly balanced with wet skid resistance.

As described above, the amount of silica inorganic filler to be blended in the first modified conjugated diene polymer composition based on 100 parts by mass of the rubber component containing a modified conjugated diene polymer is preferably 0.5 to 300 parts by mass, more preferably 5 to 200 parts by mass and further preferably 20 to 100 parts by mass. The amount of silica inorganic filler to be blended is preferably 0.5 parts by mass or more from the viewpoint of exerting addition effect of the inorganic filler and preferably 300 parts by mass or less from the viewpoint of dispersibility.

<Carbon Black>

To the first modified conjugated diene polymer composition mentioned above, carbon black may be added.

Examples of the carbon black that can be used include, but not particularly limited to, classes of carbon blacks such as SRF, FEF, HAF, ISAF and SAF. Of them, carbon black having a nitrogen adsorption specific surface area of 50 $m^2/g$ or more and an amount of dibutylphthalate (DBP) oil absorption of 80 mL/100 g, is preferable.

The content of carbon black based on 100 parts by mass of the rubber component containing a modified conjugated diene polymer is preferably 0.5 to 100 parts by mass, more preferably 3 to 100 parts by mass and further preferably 5 to 50 parts by mass. The amount of carbon black to be blended is preferably 0.5 parts by mass or more from the viewpoint of delivering performance required for use in, e.g., tire such as dry grip performance and conductivity, and preferably 100 parts by mass or less from the viewpoint of dispersibility.

<Metal Oxide and Metal Hydroxide>

To the first modified conjugated diene polymer composition mentioned above, a metal oxide and a metal hydroxide may be added in addition to a silica inorganic filler and carbon black.

The metal oxide refers to solid particles containing a substance represented by chemical formula $M_xO_y$ where M represents a metal atom, and x and y each represent an integer of 1 to 6 as a main component of a constitutional unit, and for example, alumina, titanium oxide, magnesium oxide and zinc oxide can be used.

Furthermore, a mixture of a metal oxide and an inorganic filler other than the metal oxide can be used. Examples of the metal hydroxide include, but not particularly limited to, aluminum hydroxide, magnesium hydroxide and zirconium hydroxide.

<Silane Coupling Agent>

To the first modified conjugated diene polymer composition mentioned above, a silane coupling agent may be added. The silane coupling agent has a function of facilitating the interaction between a rubber component and a silica inorganic filler and has a group having affinity or binding ability to each of the rubber component and the silica inorganic filler. Generally, a compound having a sulfur binding moiety, an alkoxysilyl group and silanol group moiety in a molecule is used. Specific examples thereof include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

The content of the silane coupling agent based on 100 parts by mass of the aforementioned silica inorganic filler is preferably 0.1 to 30 parts by mass, more preferably 0.5 to 20 parts by mass and further preferably 1 to 15 parts by mass. When the amount of silane coupling agent to be blended falls within the above range, the addition effect of the silane coupling agent can be exerted further significantly.

<Rubber Softener>

To the first modified conjugated diene polymer composition mentioned above, a rubber softener may be added from the viewpoint of improving processability.

As the rubber softener, mineral oil or liquid or low molecular weight synthetic softener is suitable.

The mineral-oil rubber softener contains oil called process oil or extender oil, which is used for softening rubber, increasing volume of rubber and improving processability of rubber. The mineral-oil rubber softener is a mixture of an aromatic ring, a naphthene ring and a paraffin chain. Of such rubber softeners, a softener in which the carbon atoms of the paraffin chain occupy 50% or more of the total carbon atoms is called a paraffin rubber softener; a softener in which the carbon atoms of the naphthene ring occupy 30 to 45% of the total carbon atoms is called a naphthene rubber softener; and a softener in which the carbon atoms of the aromatic ring occupy more than 30% of the total carbon atoms is called an aromatic rubber softener.

As the rubber softener used for the first modified conjugated diene polymer, a softener having an appropriate aromatic content is preferable since adaptability to the polymer tends to be good.

The aromatic content of a rubber softener is preferably 2 to 65%, more preferably 5 to 55% and further preferably 10 to 45%.

The content of rubber softener based on 100 parts by mass of the rubber component containing a modified conjugated diene polymer is preferably 0 to 100 parts by mass, more preferably 10 to 90 parts by mass and further preferably 30 to 90 parts by mass. When the amount of a rubber softener to be blended based on 100 parts by mass of the rubber component exceeds 100 parts by mass, bleed out tends to occur and the surface of the composition may be sticky.

<Additives>

To the first modified conjugated diene polymer composition mentioned above, other softeners and fillers other than the aforementioned materials and further various additives such as a heat resistance stabilizer, an antistatic agent, a weather resistant stabilizer, an age resister, a colorant and a lubricant may be added. As the other softeners, known softeners can be used.

Specific examples of the other fillers include calcium carbonate, magnesium carbonate, aluminum sulfate and barium sulfate. As each of the above heat resistant stabilizer, antistatic agent, weather resistant stabilizer, age resister, colorant and lubricant, known materials can be used.

(Method for Producing First Modified Conjugated Diene Polymer Composition)

The method for producing the first modified conjugated diene polymer composition is not particularly limited. For example, the aforementioned rubber component, a silica inorganic filler and other materials as needed are melted and kneaded by use of a general kneader such as an open roll, a Banbury mixer, a kneader, a single screw extruder, a double screw extruder and a multi screw extruder. In addition to this method, examples include a method in which individual components are dissolved and mixed and then a solvent is removed by heating.

Of them, the melting and kneading method using a roll, a Banbury mixer, a kneader or an extruder is preferable from the viewpoint of productivity and good kneading properties.

A modified conjugated diene polymer and various compound agents may be simultaneously kneaded or separately added in multiple portions. Both methods can be applied.

(vulcanizate)

The first modified conjugated diene polymer composition can be suitably used as a vulcanizate.

The vulcanizate can be obtained by mixing a modified conjugated diene polymer with e.g., an inorganic filler such as a silica inorganic filler, and if necessary, carbon black, a rubber-like polymer other than a modified conjugated diene polymer, a silane coupling agent, a rubber softener, a vulcanizing agent and a vulcanizing accelerator/auxiliary agent, heating and vulcanizing the mixture.

Examples of the vulcanizing agent that can be used include a radical generator such as an organic peroxide and an azo compound, an oxime compound, a nitroso compound, a polyamine compound, sulfur and a sulfur compound. Examples of the sulfur compound include sulfur monochloride, sulfur dichloride, a disulfide compound and a high-molecular weight polysulfide compound.

The amount of vulcanizing agent to be used based on 100 parts by mass of the rubber component comprising a modified conjugated diene polymer is usually 0.01 to 20 parts by mass and preferably 0.1 to 15 parts by mass. As a vulcanization method, a conventionally known method can be applied. The vulcanization temperature is usually 120 to 200° C. and preferably 140 to 180° C.

As a vulcanizing accelerator, a conventionally known material can be used. Examples of the vulcanizing accelerator include a sulfenamide agent, a guanidine agent, a thiuram agent, an aldehyde-amine agent, an aldehyde-ammonia agent, a thiazole agent, a thiourea agent and a dithiocarbamate agent.

The amount of vulcanizing accelerator to be used based on 100 parts by mass of the rubber component comprising a modified conjugated diene polymer is usually 0.01 to 20 parts by mass and preferably 0.1 to 15 parts by mass.

As a vulcanizing auxiliary agent, e.g., zinc oxide and stearic acid can be used.

If a vulcanizate is obtained by dispersing a silica inorganic filler in the modified conjugated diene polymer obtained by the first or second production method mentioned above, the vulcanizate acquires excellent balance between low hysteresis loss properties and wet skid resistance and excellent operation stability.

(Second Modified Conjugated Diene Polymer Composition)

The second modified conjugated diene polymer composition contains 5 to 200 parts by mass of a filler, which is silica and/or carbon black, based on 100 parts by mass of the rubber component comprising 20 parts by mass or more of the modified conjugated diene polymer (hereinafter sometimes referred to simply as the modified conjugated diene polymer) obtained by the first or second production method mentioned above.

The second modified conjugated diene polymer composition is suitable in the case of using the modified conjugated diene polymer to be obtained by the second production method mentioned above, in particular, in the case of using the modified conjugated diene polymer to be produced by using 1,3-butadiene as a conjugated diene compound in the polymerization step.

Note that the filler to be contained in the second modified conjugated diene polymer composition is preferably silica and carbon black and a mass ratio of silica to carbon black is preferably 1:99 to 99:1. When the modified conjugated diene polymer of the embodiment is used, the combination effect of various functional groups can be obtained. Due to this effect, dispersibility of both silica and carbon black is improved and excellent reinforcing effect can be obtained.

<Rubber Component>

As the above rubber component, rubber-like polymers other than the modified conjugated diene polymer can be used in combination. As the rubber-like polymers, the same materials as those described in the above section <Rubber-like polymer> in connection with the first modified conjugated diene polymer composition can all be used.

<Filler>

The second modified conjugated diene polymer composition contains 5 to 200 parts by mass of silica and/or carbon black as a filler based on 100 parts by mass of the rubber component comprising 20 parts by mass or more of the modified conjugated diene polymer.

If a large amount of filler is used, hardness and modulus increase. Thus, desired physical properties depending upon the application can be obtained by adjusting the content of the filler. When the content of the filler falls within the above range, the dispersion of the filler is good and good processability can be obtained.

The content of the filler is preferably 5 to 150 parts by mass for use in tire, and preferably 30 to 200 parts by mass for use in footwear. When the content of the filler falls within the range, the composition can be applied to a wide variety of products from soft products to hard products.

Note that hardness and modulus can also be adjusted by use of a plasticizer.

As the plasticizer, the same oils as the extender oils mentioned above can be used. Other than these, e.g., various naturally occurring oils, synthetic oils and low molecular weight polymers are used.

[Silica]

Examples of the silica include sedimentary silica and fumed silica. Particularly, sedimentary silica is preferably used.

As the sedimentary silica, silica having a nitrogen adsorption specific surface area ($N_2SA$) measured by the BET method of 50 to 400 m$^2$/g is preferably used and silica having $N_2SA$ of 100 to 300 m$^2$/g is more preferably used. When the $N_2SA$ falls within the range, the balance between reinforcing properties and dispersibility becomes good.

Depending upon the application, silica having a suitable particle size can be used. For example, silica having a particle size in the range of less than 200 m$^2$/g and silica having a particle size in the range of 200 m$^2$/g or more can be used in combination. By virtue of this, e.g., rolling-resistance (low hysteresis loss properties), breaking strength (fracture strength) and operation stability can be controlled.

The modified conjugated diene polymer obtained by the first or second production method mentioned above can disperse sedimentary silica well. Thus, even if silica having high specific surface area is used, the silica can be dispersed well in a composition.

[Carbon Black]

Examples of carbon black include GPF, FEF, HAF, ISAF and SAF. Carbon black can be selected depending upon the application.

Reinforcing properties can be enhanced and the dry grip performance for use in tire tread can be improved by using a plurality of carbon blacks in combination.

Carbon black having a nitrogen adsorption specific surface area ($N_2SA$) measured by the BET method of 30 to 200 $m^2/g$ is preferably used. When $N_2SA$ of carbon black falls within this range, the balance between reinforcing effect and dispersibility becomes good.

[Other Fillers]

In the second modified conjugated diene polymer composition, other fillers can be used. Examples of the fillers include alumina, calcium carbonate, clay, magnesium oxide, magnesium hydroxide, talc, titanium oxide and mica.

<Silane Coupling Agent>

In the second modified conjugated diene polymer composition, further a silane coupling agent may be used.

The silane coupling agent refers to a compound having both of a silica-affinity portion and a polymer-affinity portion in a molecule. The silica-affinity portion is typically an alkoxysilyl group. The polymer-affinity portion is e.g., polysulfide, a mercapto group or an ethylenic double bond.

Examples thereof that can be used include, but not limited to, bis(3-triethoxysilylpropyl)tetrasulfide, bis(3-triethoxysilylpropyl)trisulfide, bis(3-triethoxysilylpropyl)disulfide, bis(2-trimethoxysilylethyl)tetrasulfide, 3-mercaptopropyltrimethoxysilane, 3-mercaptopropyltriethoxysilane and 3-trimethoxysilylpropylbenzothiazolyltetrasulfide.

The amount of silane coupling agent to be blended based on 100 parts by mass of silica is preferably 1 to 20 parts by mass and more preferably 2 to 15 parts by mass.

If the silane coupling agent is blended within the range, the dispersibility of silica is further improved and processability becomes good. In addition, abrasion resistance is improved. Likewise, the performance of the vulcanized rubber is improved.

(Method for Producing Second Modified Conjugated Diene Polymer Composition)

As the method for producing the second modified conjugated diene polymer composition mentioned above, a known method such as a mechanical mixing method and mixing in the state of a solution or a dispersion solution can be applied. A mechanical kneading method by a mixer is preferable. More specifically, a known method using e.g., a roll mill, a Banbury mixer, a kneader or Brabender is suitably employed.

(vulcanizate)

The second modified conjugated diene polymer composition is suitably used as a vulcanizate.

A vulcanizate can be obtained by mixing a modified conjugated diene polymer with e.g., a filler, which is silica and/or carbon black, a rubber-like polymer other than the modified conjugated diene polymer, a silane coupling agent, additives, a vulcanizing agent and a vulcanizing accelerator/auxiliary agent, heating and vulcanizing the mixture.

As the vulcanizing agent, a radical generator such as an organic peroxide and an azo compound, an oxime compound, a nitroso compound, a polyamine compound, sulfur and a sulfur compound can be used. Examples of the sulfur compound include sulfur monochloride, sulfur dichloride, a disulfide compound and a high-molecular weight polysulfide compound.

The amount of vulcanizing agent to be used based on 100 parts by mass of the rubber component comprising a modified conjugated diene polymer is preferably 0.01 to 20 parts by mass and more preferably 0.1 to 15 parts by mass.

As a vulcanization method, a conventionally known method can be applied. The vulcanization temperature is preferably 120 to 200° C. and more preferably 140 to 180° C.

As a vulcanizing accelerator, a conventionally known material can be used. Examples of the vulcanizing accelerator include a sulfenamide agent, a guanidine agent, a thiuram agent, an aldehyde-amine agent, an aldehyde-ammonia agent, a thiazole agent, a thiourea agent and a dithiocarbamate agent.

The amount of vulcanizing accelerator based on 100 parts by mass of the rubber component comprising a modified conjugated diene polymer is usually 0.01 to 20 parts by mass and preferably 0.1 to 15 parts by mass.

As a vulcanizing auxiliary agent, e.g., zinc oxide and stearic acid can be used.

[Rubber Composition Obtained by Crosslinking Modified Conjugated Diene Polymer Composition]

The first and second modified conjugated diene polymer compositions described above are each crosslinked by adding e.g., a crosslinking agent and various compound agents to prepare a rubber composition, which can be used in producing desired rubber products.

As the crosslinking agent, e.g., a sulfur vulcanizing agent and an organic peroxide are used.

Examples of the compound agent include a vulcanizing accelerator and a vulcanizing auxiliary agent.

As the sulfur vulcanizing agent, for example, sulfur and morpholine disulfide are used. Examples of the organic peroxide that is used include benzoyl peroxide, dicumyl peroxide, di-t-butyl peroxide, t-butylcumyl peroxide and cumene hydroperoxide.

As the vulcanizing accelerator, an agent containing at least one of a sulfenamide, thiazole, thiuram, thiourea, guanidine, dithiocarbamic acid, aldehyde-amine, or aldehyde-ammonia, imidazoline or xanthate vulcanizing accelerator can be used.

As the vulcanizing auxiliary agent, e.g., zinc oxide and stearic acid can be used. Furthermore, an age resister can be used.

[Tire and the Like]

Rubber compositions obtained by crosslinking the first and second modified conjugated diene polymer compositions mentioned above can be used in tire, vibration-proof rubber and various industrial products.

In particular, the rubber compositions are suitably used as the rubber materials for tire tread and rubber materials for cap tread and under tread.

EXAMPLES

The present invention will be more specifically described by way of the following Examples; however, the present invention is not limited by the following Examples in any way.

Note that, samples were analyzed by the following methods.

(1) Amount of Bound Styrene 100 mg of a sample was diluted in chloroform in a measuring cylinder to 100 mL and dissolved to prepare a measurement sample. The amount (mass %) of bound styrene was determined by measuring absorption of a phenyl group of styrene at UV 254 nm (spectrophotometer "UV-2450" manufactured by Shimadzu Corporation).

(2) Microstructure of Butadiene Moiety (Amount of 1,2-Vinyl Bonding)

50 mg of a sample was dissolved in 10 mL of carbon disulfide to prepare a measurement sample. Using a solution cell, an infrared spectrum was measured in the range of 600 to 1000 $cm^{-1}$ and absorbance at a predetermined wave number was obtained. Based on the absorbance, the microstructure of the butadiene moiety was obtained by the computational expression of the Hampton's method (Fourier conversion infrared spectrophotometer "FT-IR230" manufactured by JASCO Corporation).

(3) Mooney Viscosity

Mooney viscosity was measured by a Mooney viscometer ("VR1132" manufactured by Ueshima Seisakusho Co., Ltd.) in accordance with JIS K6300 (IS0289-1). The measurement temperature was set at 100° C. First, a sample was preheated for one minute and a rotor was rotated at 2 rpm. Four minutes later, torque was measured to obtain Mooney viscosity ($ML_{1+4}$).

(4) Glass Transition Temperature (Tg)

A DSC curve was recorded by use of a differential scanning calorimeter (DSC3200S) manufactured by Mac Science, in accordance with ISO 22768:2006, while supplying helium at a rate of 50 mL/minute and increasing the temperature from −100° C. at a rate of 20° C./minute. The peak top (Inflection point) of the DSC differential curve was determined as a glass transition temperature.

(5) Molecular Weight

A chromatogram was obtained by use of a GPC measurement apparatus in which three columns charged with polystyrene gel as a filler were connected. Based on the calibration curve using standard polystyrene, the weight average molecular weight (Mw) and the number average molecular weight (Mn) were obtained and a molecular weight distribution (Mw/Mn) was calculated.

As an eluent, tetrahydrofuran (THF) was used.

As the column, a guard column: TSK guard column Super H-H manufactured by Tosoh Corporation, and columns: TSKgel Super H7000, TSKgel Super H6000 and TSKgel Super H5000 manufactured by Tosoh Corporation were used.

Under the conditions: an oven temperature of 40° C. and a THF flow rate of 1.0 mL/minute, an RI detector ("HLC8320" manufactured by Tosoh Corporation) was used.

10 mg of a measurement sample was dissolved in 20 mL of THF to prepare a measurement solution and 200 μL of measurement solution was injected into a GPC measurement apparatus and measurement was performed.

(6) Degree of Branching

Assuming that the molecular weight of the peak top in a GPC chromatogram of the conjugated diene polymer having an active end obtained in the polymerization step and inactivated with e.g., alcohol, (unmodified polymer) was represented by Mb and the molecular weight of the peak top in a GPC chromatogram of the modified conjugated diene polymer (modified polymer) obtained after the step of modifying the active end was represented by Mc, the fraction of the component satisfying Mc/Mb≥3 was calculated. The fraction was defined as a "component fraction of 3 branches or more."

(7) Modification Ratio

Modification ratio was measured by using a phenomenon where a modified component adsorbs to a GPC column charged with silica gel as a filler.

Difference between a chromatogram, which was obtained by measuring a sample and a sample solution containing a low molecular weight internal standard polystyrene by a polystyrene gel column and a chromatogram, which was obtained by measuring them by a silica column, was obtained. Based on the difference, the amount of adsorption to the silica column was measured to obtain a modification ratio.

Preparation of Sample Solution:

10 mg of a sample and 5 mg of standard polystyrene were dissolved in 20 mL of THF to prepare a sample solution.

GPC Measurement Conditions Using a Polystyrene Column:

Measurement was performed by using THF as an eluent and injecting 200 μL of a sample into the apparatus. As the columns, a guard column: TSK guard column Super H-H manufactured by Tosoh Corporation, and columns: TSKgel Super H7000, TSKgel Super H6000 and TSKgel Super H5000 manufactured by Tosoh Corporation were used.

Measurement was performed under the conditions: a column oven temperature of 40° C. and a THF flow rate of 1.0 mL/minute, by using an RI detector ("HLC8320" manufactured by Tosoh Corporation) to obtain a chromatogram.

GPC Measurement Conditions Using a Silica Column:

Measurement was performed by using THF as an eluent and injecting 200 μL of a sample into the apparatus. As the columns, a guard column: DIOL 4.6×12.5 mm, 5 microns, and columns: Zorbax PSM-1000S, PSM-3005 and PSM-60S were used. Under the conditions: column oven temperature of 40° C. and a THF flow rate of 0.5 mL/minute, measurement was performed by CCP8020 series built-up type GPC system: AS-8020, SD-8022, CCPS, CO-8020 and RI-8021 manufactured by Tosoh Corporation, and by use of an RI detector to obtain a chromatogram.

Calculation Method of Modification Ratio:

Assuming that the total peak area of a chromatogram using a polystyrene column was 100, the peak area of a sample was represented by P1, the peak area of standard polystyrene was represented by P2; and assuming that the total peak area of a chromatogram using a silica column was 100, the peak area of a sample was represented by P3, the peak area of standard polystyrene was represented by P4, a modification ratio (%) was obtained by the following equation:

$$\text{Modification ratio (\%)}=[1-(P2 \times P3)/(P1 \times P4)] \times 100$$

(Note that P1+P2=P3+P4=100.)

(8) Styrene Chain

In accordance with the Kolthoff's method, an osmium acid decomposition product was obtained as a measurement sample. Using this, insoluble polystyrene corresponding to a block polystyrene was precipitated in methanol.

The amount of insoluble polystyrene was quantified and the amount (mass %) of block styrene per polymer was obtained.

The content (mass %) of a single chain styrene consisting of one styrene unit in the total styrene and the content (mass %) of long-chain styrene consisting of 8 or more consecutive styrene units in the total styrene were obtained in accordance with Tanaka et al. method (Polymer, 22, 1721 (1981)) by decomposing a styrene-butadiene copolymerized rubber with ozone followed by analysis by gel permeation chromatography (GPC).

Production Example 1

Synthesis of (4-(2-pyrrolidinoethyl)styrene)

In Production Example 1, 4-(2-pyrrolidinoethyl)styrene: Py-St, was synthesized as a nitrogen atom-containing vinyl compound to be used in the polymerization step.

First, to a pressure-proof container having an inner volume of 1 L and sufficiently purged with nitrogen, 388 g of cyclohexane, 36 g of pyrrolidine and 65 g of divinylbenzene were added and allowed to stand still in a water bath regulated at 0° C.

Subsequently, a cyclohexane solution containing 0.072 g of n-butyllithium was added and stirred.

Two hours later, isopropanol was added to the system to terminate the reaction.

Extraction/washing/purification were performed to obtain 4-(2-pyrrolidinoethyl)styrene.

Example 1

A temperature controllable autoclave having an inner volume of 5 L and equipped with a stirrer and a jacket was used as a reactor. In the reactor, 265 g of 1,3-butadiene (Bd), 93 g of styrene (St), 1.66 g of N,N-dimethylvinylbenzylamine (DMVB), 1633 g of normal hexane (nHex) and 0.85 g of 2,2-bis(2-oxolanyl)propane serving as a polar substance, from which impurities were previously removed, were placed and the interior temperature of the reactor was maintained at 55° C.

A cyclohexane solution containing 0.33 g of n-butyllithium serving as a polymerization initiator was supplied to the reactor.

After initiation of a polymerization reaction, the interior temperature of the reactor started increasing by heat generation due to polymerization and the final interior temperature of the reactor reached 82° C.

Two minutes after the reaction temperature reached the peak, 0.40 g of 2,2-dimethoxy-1-(3-trimethoxysilylpropyl)-1-aza-2-silacyclopentane was added to the reactor, and a modification reaction was carried out at 75° C. for 5 minutes.

At this time, the molar ratio of N,N-dimethylvinylbenzylamine and the modifier relative to n-butyllithium was 2.00 and 0.25, respectively.

To the polymer solution, 0.7 g of an antioxidant (2,6-di-tert-butyl-4-hydroxytoluene; BHT) was added, and thereafter the solvent was removed by steam tripping and drying treatment was applied by a dryer to obtain a styrene-butadiene copolymer (modified conjugated diene polymer; sample A) having a modified component.

As a result of analysis of sample A, the amount of bound styrene was 27 mass % and amount of bound butadiene was 73 mass %. The Mooney viscosity at 100° C. was 52. The amount of vinyl linkage (amount of 1,2-bonding) in the microstructure of a butadiene moiety, obtained by calculation in accordance with the Hampton's method based on the measurement results by use of an infrared spectrophotometer was 57%. Furthermore, the modification ratio was 94%. The analysis results of sample A were shown in Table 1.

Example 2

Sample B was obtained in the same manner as in preparation of the above (sample A) except that the amount of N,N-dimethylvinylbenzylamine to be added was 3.32 g.

The molar ratio of N,N-dimethylvinylbenzylamine and the modifier relative to n-butyllithium were 4.00 and 0.25, respectively.

As a result of analysis of sample B, the amount of bound styrene was 27 mass % and the amount of bound butadiene was 73 mass %. The Mooney viscosity at 100° C. was 55. The amount of vinyl linkage (amount of 1,2-bonding) in the microstructure of a butadiene moiety, obtained by calculation in accordance with the Hampton's method based on the measurement results by use of an infrared spectrophotometer was 54%. Furthermore, the modification ratio was 92%. The analysis results of sample B were shown in Table 1.

Example 3

Sample C was obtained in the same manner as in preparation of the above sample A except that the amount of N,N-dimethylvinylbenzylamine to be added was 6.64 g.

The molar ratio of N,N-dimethylvinylbenzylamine and the modifier relative to n-butyllithium were 8.00 and 0.25, respectively.

As a result of analysis of sample C, the amount of bound styrene was 26 mass % and the amount of bound butadiene was 74 mass %. The Mooney viscosity at 100° C. was 54. The amount of vinyl linkage (amount of 1,2-bonding) in the microstructure of a butadiene moiety, obtained by calculation in accordance with the Hampton's method based on the measurement results by use of an infrared spectrophotometer was 55%. Furthermore, the modification ratio was 90%. The analysis results of sample C were shown in Table 1.

Example 4

Sample D was obtained in the same manner as in preparation of the above sample A except that 4-(2-pyrrolidinoethyl)styrene was added in place of N,N-dimethylvinylbenzylamine in an amount of 2.07 g.

In this Example, the molar ratio of 4-(2-pyrrolidinoethyl)styrene and the modifier relative to n-butyllithium were 2.00 and 0.25, respectively.

As a result of analysis of sample D, the amount of bound styrene was 27 mass % and the amount of bound butadiene was 73 mass %. The Mooney viscosity at 100° C. was 49. The amount of vinyl linkage (amount of 1,2-bonding) in the microstructure of a butadiene moiety, obtained by calculation in accordance with the Hampton's method based on the measurement results by use of an infrared spectrophotometer was 57%. Furthermore, the modification ratio was 92%. The analysis results of sample D were shown in Table 1.

Example 5

Two autoclaves having an inner volume of 10 L, a ratio (L/D) of the height and diameter of the interior portion of 4, and an inlet at the bottom and an outlet on the top, and equipped with a stirrer and a jacket for adjusting temperature were connected in line. The first autoclave was used as a polymerization reactor; whereas the second autoclave was used as a modification reactor.

1,3-Butadiene at 17.8 g/minute, styrene at 6.2 g/minute, N,N-dimethylvinylbenzylamine (DMVB) at 0.94 g/minute and n-hexane at 125.6 g/minute, from which impurities such as water were previously removed, were mixed. Immediately before the mixed solution was placed in the first reactor, n-butyllithium for inactivating impurities was mixed at 0.075 mmol/minute by a static mixer, and then, the mixed solution was continuously supplied to the bottom of the first reactor. Then, 2,2-bis(2-oxolanyl)propane as a polar substance was supplied to the bottom of the first reactor at a rate of 0.020 g/minute and n-butyllithium as a polymerization initiator was supplied at a rate of 0.187 mmol/minute. The polymerization reaction was continuously performed such that the interior temperature of the reactor outlet was 90° C.

An aliquot of the polymer solution before a modifier was added was taken out from the outlet of the first reactor and an antioxidant (BHT) was added in an amount of 0.2 g per 100 g of polymer. After that, the solvent was removed and the Mooney viscosity at 100° C. was measured. The Mooney viscosity was 49.

The temperature of the second reactor was maintained at 85° C., 2,2-dimethoxy-1-(3-trimethoxysilylpropyl)-1-aza-2-silacyclopentane as a modifier was added at a rate of 0.060 mmol/minute from the bottom of the second reactor to perform a modification (coupling) reaction. To the polymer solution which flowed out from the top portion of the second reactor, an antioxidant (BHT) was continuously added so as to satisfy an amount of 0.2 g per 100 g of polymer at a rate of 0.048 g/minute (n-hexane solution) to terminate the modification reaction. After that, S-RAE oil ("JOMO process NC140" manufactured by JX Nippon Oil & Energy Corporation) as extender oil was added so as to satisfy 30.0 g per 100 g of polymer, and the solvent was removed to obtain a modified conjugated diene polymer (sample E).

As a result of analysis of sample E, Mooney viscosity at 100° C. was 75. Furthermore, the amount of bound styrene was 26 mass %; the amount of bound butadiene was 74 mass %; the amount of vinyl linkage (amount of 1,2-bonding) in the butadiene binding unit was 55 mole %; and the modification ratio was 91%. The analysis results of sample E are shown in Table 2.

Comparative Example 1

A temperature controllable autoclave having an inner volume of 5 L and equipped with a stirrer and a jacket was used as a reactor. In the reactor, 265 g of 1,3-butadiene, 93 g of styrene, 1.65 g of 4-tert-butylstyrene (tBu-St), 1633 g of normal hexane and 0.85 g of 2,2-bis(2-oxolanyl)propane serving as a polar substance, from which impurities were previously removed, were placed and the interior temperature of the reactor was maintained at 55° C.

A cyclohexane solution containing 0.33 g of n-butyllithium serving as a polymerization initiator was supplied to the reactor.

After initiation of a polymerization reaction, the interior temperature of the reactor started increasing by heat generation due to polymerization and the final interior temperature of the reactor reached 83° C.

Two minutes after the reaction temperature reached the peak, 0.40 g of 2,2-dimethoxy-1-(3-trimethoxysilylpropyl)-1-aza-2-silacyclopentane was added to the reactor and a modification reaction was carried out at 75° C. for 5 minutes.

At this time, the molar ratio of 4-tert-butylstyrene and the modifier relative to n-butyllithium was 2.00 and 0.25, respectively.

An antioxidant was added and the solvent was removed by steam tripping in the same manner as in preparation of sample A above to obtain sample F.

As a result of analysis of sample F, the amount of bound styrene was 26 mass % and amount of bound butadiene was 74 mass %. The Mooney viscosity at 100° C. was 54. The amount of vinyl linkage (amount of 1,2-bonding) in the microstructure of a butadiene moiety obtained by calculation in accordance with the Hampton's method based on the measurement result by use of an infrared spectrophotometer was 56%. Furthermore, the modification ratio was 78%. The analysis results of sample F were shown in Table 1.

Comparative Example 2

A temperature controllable autoclave having an inner volume of 5 L and equipped with a stirrer and a jacket was used as a reactor. In the reactor, 265 g of 1,3-butadiene, 93 g of styrene, 0.70 g of N,N-dimethylvinylbenzylamine, 1633 g of normal hexane and 0.34 g of 2,2-bis(2-oxolanyl)propane serving as a polar substance, from which impurities were previously removed, were placed and the interior temperature of the reactor was maintained at 55° C.

A cyclohexane solution containing 0.14 g of n-butyllithium serving as a polymerization initiator was supplied to the reactor.

After initiation of a polymerization reaction, the interior temperature of the reactor started increasing by heat generation due to polymerization and the final interior temperature of the reactor reached 72° C. The molar ratio of N,N-dimethylvinylbenzylamine relative to n-butyllithium was 2.00.

An antioxidant was added and the solvent was removed by steam tripping in the same manner as in preparation of sample A above to obtain sample G.

As a result of analysis of sample G, the amount of bound styrene was 26 mass % and amount of bound butadiene was 74 mass %. The Mooney viscosity at 100° C. was 52. The amount of vinyl linkage (amount of 1,2-bonding) in the microstructure of a butadiene moiety obtained by calculation in accordance with the Hampton's method based on the measurement result by use of an infrared spectrophotometer was 55%. Furthermore, the modification ratio was 79%. The analysis results of sample G were shown in Table 1.

Comparative Example 3

A temperature controllable autoclave having an inner volume of 5 L and equipped with a stirrer and a jacket was used as a reactor. In the reactor, 265 g of 1,3-butadiene, 93 g of styrene, 1.06 g of N,N-dimethylvinylbenzylamine, 1633 g of normal hexane and 0.54 g of 2,2-bis(2-oxolanyl)propane serving as a polar substance, from which impurities were previously removed, were placed and the interior temperature of the reactor was maintained at 55° C.

A cyclohexane solution containing 0.21 g of n-butyllithium serving as a polymerization initiator was supplied to the reactor.

After initiation of a polymerization reaction, the interior temperature of the reactor started increasing by heat generation due to polymerization and the final interior temperature of the reactor reached 76° C.

Two minutes after the reaction temperature reached the peak, 0.33 g of N-n-butyl-aza-2,2-dimethoxysilacyclopentane was added to the reactor and a modification reaction was carried out at 75° C. for 5 minutes. At this time, the molar ratio of N,N-dimethylvinylbenzylamine and a modifier relative to n-butyllithium was 2.00 and 0.50, respectively.

An antioxidant was added and the solvent was removed by steam tripping in the same manner as in preparation of sample A above to obtain sample H.

As a result of analysis of sample H, the amount of bound styrene was 26 mass % and amount of bound butadiene was 74 mass %.

The Mooney viscosity at 100° C. was 56. The amount of vinyl linkage (amount of 1,2-bonding) in the microstructure of a butadiene moiety obtained by calculation in accordance with the Hampton's method based on the measurement result by use of an infrared spectrophotometer was 57%. Furthermore, the modification ratio was 93%. The analysis results of sample H were shown in Table 1.

TABLE 1

| | | | Example 1 | Example 2 | Example 3 | Example 4 | Comparative Example 1 | Comparative Example 2 | Comparative Example 3 |
|---|---|---|---|---|---|---|---|---|---|
| | | | | | | Sample No. | | | |
| | | | A | B | C | D | F | G | H |
| Bd | | (g) | 265 | 265 | 265 | 265 | 265 | 265 | 265 |
| St | | (g) | 93 | 93 | 93 | 93 | 93 | 93 | 93 |
| Vinyl compound | Type *1 | | DMVB | DMVB | DMVB | Py-St | tBu-St | DMVB | DMVB |
| | Amount to be added | (g) | 1.66 | 3.32 | 6.64 | 2.07 | 1.65 | 0.70 | 1.06 |
| | Molar ratio to Li | | 2.00 | 4.00 | 8.00 | 2.00 | 2.00 | 2.00 | 2.00 |
| nHex | | (g) | 1633 | 1633 | 1633 | 1633 | 1633 | 1633 | 1633 |
| Initiation temperature | | (°C.) | 55 | 55 | 55 | 55 | 55 | 55 | 55 |
| Peak temperature | | (°C.) | 82 | 81 | 80 | 80 | 83 | 72 | 76 |
| Initiator | Type *2 | | NBL | NBL | NBL | NBL | NBL | NBL | NBL |
| | Amount to be added | (g) | 0.33 | 0.33 | 0.33 | 0.33 | 0.33 | 0.14 | 0.21 |
| Polar substance | Amount to be added | (g) | 0.85 | 0.85 | 0.85 | 0.85 | 0.85 | 0.34 | 0.54 |
| Modifier | Type *3 | | AS-1 | AS-1 | AS-1 | AS-1 | AS-1 | — | AS-2 |
| | Amount to be added | (g) | 0.40 | 0.40 | 0.40 | 0.40 | 0.40 | — | 0.33 |
| | Molar ratio to Li | | 0.25 | 0.25 | 0.25 | 0.25 | 0.25 | — | 0.50 |
| Mooney viscosity | | | 52 | 55 | 54 | 49 | 54 | 52 | 56 |
| Molecular weight (×10$^4$) | Weight average molecular weight (Mw) | | 16.5 | 16.9 | 17.2 | 16.0 | 16.6 | 17.4 | 17.6 |
| | Number average molecular weight (Mn) | | 11.9 | 10.6 | 9.9 | 11.6 | 12.3 | 15.8 | 13.9 |
| Mw/Mn | | | 1.39 | 1.59 | 1.73 | 1.38 | 1.35 | 1.10 | 1.27 |
| Amount of bound styrene | | (mass %) | 27 | 27 | 26 | 27 | 26 | 26 | 26 |
| Amount of vinyl linkage (amount of 1,2-bonding) | | (mol %) | 57 | 54 | 55 | 57 | 56 | 55 | 57 |
| Fraction of component having 3 or more branches | | (mass %) | 84 | 85 | 82 | 83 | 78 | 0 | 0 |
| Modification ratio | | (%) | 94 | 92 | 90 | 92 | 78 | 79 | 93 |

TABLE 2

| | | | Example 5 |
|---|---|---|---|
| | | | Sample No. |
| | | | E |
| | Bd | (g/minute) | 17.8 |
| | St | (g/minute) | 6.2 |
| Vinyl compound | Type *1 | | DMVB |
| | Amount to be added | (g/minute) | 0.94 |
| | Molar ratio to Li | | 2.00 |
| | nHex | (g/minute) | 125.6 |
| | Polymerization temperature | (°C.) | 90 |
| Initiator | Impurity treatment NBL *2 | (mmol/minute) | 0.075 |
| | Polymerization NBL *2 | (mmol/minute) | 0.187 |
| Polar substance | Amount to be added | (g/minute) | 0.02 |
| Modifier | Type *3 | | AS-1 |
| | Amount to be added | (mmol/minute) | 0.06 |
| Mooney viscosity | Molar ratio to Li | | 0.25 |
| | Before modification | | 49 |
| | After oil extension | | 75 |
| Molecular weight (×10$^4$) | Weight average molecular weight (Mw) | | 56.1 |
| | Number average molecular weight (Mn) | | 25 |
| | Mw/Mn | | 2.24 |
| Amount of bound styrene | | (mass %) | 26 |
| Amount of vinyl linkage (amount of 1,2-bonding) | | (mol %) | 55 |
| Modification ratio | | (%) | 91 |

*1 to *3 in Table 1 and Table 2 will be described below.

*1 DMVB: N,N-dimethylvinylbenzylamine, Py-St: 4-(2-pyrrolidinoethyl)styrene tBu-St: 4-tert-butylstyrene

*2 NBL: normal butyllithium

*3 AS-1: 2,2-dimethoxy-1-(3-trimethoxysilylpropyl)-1-aza-2-silacyclopentane AS-2: N-n-butyl-aza-2,2-dimethoxysilacyclopentane Examples 6 to 10, Comparative Examples 4 to 6

Rubber compositions containing each of raw material rubbers (samples A to D, F to H) shown in Table 1 and (sample E) shown in Table 2 were obtained according to the formulations shown below.

Modified conjugated diene polymer (samples A to D, F to H): 100.0 parts by mass, (sample E): 130.0 parts by mass Silica ("Ultrasil VN3" manufactured by Evonik Degussa GmbH, nitrogen adsorption specific surface area: 175 m$^2$/g): 75.0 parts by mass Carbon black ("SEAST KH (N339)" manufactured by Tokai Carbon Co., Ltd.): 5.0 parts by mass Silane coupling agent ("Si75", bis(triethoxysilylpropyl) disulfide, manufactured by Evonik Degussa GmbH): 6.0 parts by mass S-RAE oil (JOMO process NC140" manufactured by JX Nippon Oil & Energy Corporation): 30.0 parts by mass (samples A to D, F to H alone. Not added to Sample E)

Zinc oxide: 2.5 parts by mass

Stearic acid: 2.0 parts by mass

Age resister (N-isopropyl-N'-phenyl-p-phenylenediamine): 2.0 parts by mass

Sulfur: 1.8 parts by mass

Vulcanizing accelerator (N-cyclohexyl-2-benzothiazylsulfine amide): 1.7 parts by mass Vulcanizing accelerator (diphenylguanidine): 2.0 parts by mass Total: 228.0 parts by mass The aforementioned materials were kneaded by the following method to obtain rubber compositions.

Each of the raw material rubbers (A to H), a filler (silica, carbon black), an organic silane coupling agent, process oil, zinc oxide and stearic acid were kneaded by using an airtight mixer equipped with a temperature control unit (inner volume: 0.5 L), under the conditions of a first-stage kneading: a charge rate of 65% and rotor spinning number: 50/57 rpm. At this time, the temperature of the airtight mixer was controlled. At a discharge temperature of 155 to 160° C., rubber compositions (blend) were obtained.

Subsequently, a second-stage kneading was performed. After the blend obtained above was cooled to room temperature, an age resister was added. The mixture was kneaded again in order to improve dispersion of silica. Also in this case, the discharge temperature of the blend was adjusted at 155 to 160° C. by the temperature control of the mixer. After cooling, sulfur and a vulcanizing accelerator were added and kneaded (three stage kneading) by an open roll set at 70° C. Thereafter, the blend was molded and vulcanized by a vulcanization press at 160° C. for 20 minutes.

After the vulcanization, the viscoelasticity of the rubber compositions was measured. The measurement results of viscoelasticity were shown in Table 3.

The viscoelasticity of the rubber compositions was measured by the following method.

Viscoelasticity parameters were measured by a viscoelasticity tester, "ARES" manufactured by Rheometric Scientific at a torsion mode.

Individual measurement values were indexed based on the values of Comparative Example 4 regarded as 100.

Tan $\delta$ measured at 0° C., a frequency of 10 Hz, a strain of 1% was used as an indicator of wet skid resistance. The larger the value, the better the wet skid resistance.

Tan $\delta$ measured at 50° C., a frequency of 10 Hz and a strain of 3% was used as an indicator of fuel saving properties. The smaller the value, the better the fuel saving performance.

Complex elastic modulus $|G^*|$ ($|G^*|=(G'^2+G''^2)^{1/2}$) at 50° C., a frequency of 10 Hz and a strain of 3% was used as an indicator of operation stability. The larger the value, the better the operation stability. G' and G'' each represent a storage elastic modulus and loss elastic modulus, respectively.

pared to the composition of Comparative Example 5 using sample G in which the active end of a polymer chain is not modified and the composition of Comparative Example 6 using sample H in which the active end of a polymer chain is modified with a modifier other than the compound represented by the formula (1).

From the above, it was confirmed that vulcanizes obtained from the modified conjugated diene polymers and the modified conjugated diene polymer compositions according to Examples have excellent balance between low hysteresis loss properties and wet skid resistance and excellent operation stability.

Example 11

A temperature controllable autoclave having an inner volume of 11 L and equipped with a stirrer and a jacket was used as a reactor. In the reactor, 770 g of 1,3-butadiene (Bd), 260 g of styrene (St), 4250 g of cyclohexane (cHex) and (1.45 g of 2,2-bis(2-oxolanyl)propane serving as a polar substance, from which impurities were previously removed, were placed and the interior temperature of the reactor was maintained at 38° C.

A cyclohexane solution containing 13.0 mmol of n-butyllithium serving as a polymerization initiator was supplied to the reactor.

After initiation of a polymerization reaction, the interior temperature of the reactor started increasing by heat generation due to polymerization and the final interior temperature of the reactor reached 90° C.

Two minutes after the reaction temperature reached the peak, 3.25 mmol of 2,2-dimethoxy-1-(3-trimethoxysilylpropyl)-1-aza-2-silacyclopentane was added to the reactor and a modification reaction was performed for 5 minutes.

Subsequently, 52 mmol of diethylaminodimethylsilane and a solution of chloroplatinic acid in isopropanol were added.

TABLE 3

| | | | Example 6 | Example 7 | Example 8 | Example 9 | Example 10 | Comparative Example 4 | Comparative Example 5 | Comparative Example 6 |
|---|---|---|---|---|---|---|---|---|---|---|
| | | | Modified conjugated diene copolymer (Sample No.) | | | | | | | |
| | | | A | B | C | D | E | F | G | H |
| Physical properties of rubber composition | 0° C. tan$\delta$ (strain 1%) | Index | 112 | 113 | 104 | 106 | 104 | 100 | 89 | 102 |
| | 50° C. tan$\delta$ (strain 3%) | Index | 99 | 97 | 99 | 99 | 99 | 100 | 123 | 100 |
| | $|G^*|$ (50° C., strain 3%) | Index | 104 | 106 | 102 | 103 | 105 | 100 | 86 | 102 |

As shown in Table 3, it was confirmed that the modified conjugated diene polymer compositions of Examples 6 to 10 using samples A to E containing a nitrogen atom in a polymer chain, compared to the composition of Comparative Example 4 using sample F containing no nitrogen atom in the main chain of the polymer, have high tan $\delta$ at 0° C. (excellent wet skid resistance), as well as low tan $\delta$ at 50° C. (small hysteresis loss), which demonstrates low rolling-resistance of tire, and further have high $|G^*|$, which demonstrates excellent operation stability.

It was also confirmed that the modified conjugated diene polymer compositions of Examples 6 to 10 using samples A to E modified with a modifier, which is a compound represented by the formula (1) have excellent wet skid resistance, low hysteresis loss properties and operation stability, com- The chloroplatinic acid used herein was 0.25 mmol/mol relative to the hydrosilane compound.

Stirring was continued while maintaining the interior temperature at 90° C. One hour later, the reaction mixture was transferred to a blend tank. As a stabilizer, BHT was added in an amount of 1 mass % relative to the polymer. The solvent was removed by a drum dryer for laboratory use to obtain a polymer. The obtained polymer was designated as polymer I.

As a result of analysis of polymer I, the amount of bound styrene was 25 mass % and the amount of bound butadiene was 75 mass %.

The Mooney viscosity at 100° C. was 60.

The amount of vinyl linkage (amount of 1,2-bonding) in the microstructure of the butadiene moiety obtained by calculation in accordance with the Hampton's method based on the measurement result by an infrared spectrophotometer was 52 mole %.

The modification ratio was 99%.
The glass transition temperature was −30° C.
The analysis results of polymer I were shown in Table 4.

Example 12

A temperature controllable autoclave having an inner volume of 11 L and equipped with a stirrer and a jacket was used as a reactor. In the reactor, 770 g of 1,3-butadiene, 260 g of styrene, 4250 g of cyclohexane and 1.45 g of 2,2-bis(2-oxolanyl)propane serving as a polar substance, from which impurities were previously removed, were placed and the interior temperature of the reactor was maintained at 38° C.

As a polymerization initiator, a cyclohexane solution containing 13.0 mmol of hexamethyleneiminolithium previously obtained by reacting hexamethylene imine (13.0 mmol) and n-butyllithium (13.0 mmol), was supplied to a reactor.

After initiation of a polymerization reaction, the interior temperature of the reactor started increasing by heat generation due to polymerization and the final interior temperature of the reactor reached 90° C.

Two minutes after the reaction temperature reached the peak, 3.25 mmol of 2,2-dimethoxy-1-(3-trimethoxysilylpropyl)-1-aza-2-silacyclopentane was added to the reactor and a modification reaction was performed for 5 minutes.

Subsequently, 26 mmol of dimethylmonoethoxysilane and a solution of chloroplatinic acid in isopropanol were added. The chloroplatinic acid used herein was 0.30 mmol/mol relative to the hydrosilane compound.

Stirring was continued while maintaining the interior temperature at 90° C. One hour later, the reaction mixture was transferred to a blend tank. As a stabilizer, BHT was added in an amount of 1 mass % relative to the polymer. The solvent was removed by a drum dryer for laboratory use to obtain a polymer. The obtained polymer was designated as polymer J.

As a result of analysis of polymer J, the amount of bound styrene was 25 mass % and the amount of bound butadiene was 75 mass %.

The Mooney viscosity at 100° C. was 65.
The amount of vinyl linkage (amount of 1,2-bonding) in the microstructure of the butadiene moiety obtained by calculation in accordance with the Hampton's method based on the measurement result by an infrared spectrophotometer was 52 mole %.

The modification ratio was 99%.
The glass transition temperature was −30° C. The analysis results of polymer J were shown in Table 4.

Comparative Example 7

A temperature controllable autoclave having an inner volume of 11 L and equipped with a stirrer and a jacket was used as a reactor. In the reactor, 770 g of 1,3-butadiene, 260 g of styrene, 4250 g of cyclohexane and 1.00 g of 2,2-bis(2-oxolanyl)propane serving as a polar substance, from which impurities were previously removed, were placed and the interior temperature of the reactor was maintained at 38° C.

A cyclohexane solution containing 7.9 mmol of n-butyllithium serving as a polymerization initiator was supplied to the reactor.

After initiation of a polymerization reaction, the interior temperature of the reactor started increasing by heat generation due to polymerization and the final interior temperature of the reactor reached 88° C. Two minutes after the reaction temperature reached the peak, 3.96 mmol of 3-(dimethylamino)propyltriethoxysilane was added to the reactor and a modification reaction was performed for 5 minutes.

Thereafter, the reaction mixture was transferred to a blend tank, and BHT was added in an amount of 1 mass % relative to the polymer as a stabilizer and the solvent was removed by use of a drum dryer for laboratory use to obtain a polymer.

The obtained polymer was designated as polymer K.
As a result of analysis of polymer K, the amount of bound styrene was 25 mass % and the amount of bound butadiene was 75 mass %.

The Mooney viscosity at 100° C. was 58.
The amount of vinyl linkage (amount of 1,2-bonding) in the microstructure of the butadiene moiety obtained by calculation in accordance with the Hampton's method based on the measurement result by an infrared spectrophotometer was 53 mole %.

The modification ratio was 80%.
The glass transition temperature was −29° C.
The analysis results of polymer K were shown in Table 4.

Comparative Example 8

A temperature controllable autoclave having an inner volume of 11 L and equipped with a stirrer and a jacket was used as a reactor. In the reactor, 770 g of 1,3-butadiene, 260 g of styrene, 4250 g of cyclohexane and 1.45 g of 2,2-bis(2-oxolanyl)propane serving as a polar substance, from which impurities were previously removed, were placed and the interior temperature of the reactor was maintained at 38° C.

A cyclohexane solution containing 13.0 mmol of n-butyllithium serving as a polymerization initiator was supplied to the reactor.

After initiation of a polymerization reaction, the interior temperature of the reactor started increasing by heat generation due to polymerization and the final interior temperature of the reactor reached 90° C.

Two minutes after the reaction temperature reached the peak, 3.25 mmol of silicon tetrachloride was added to the reactor to perform a modification reaction for 5 minutes.

Subsequently, 26 mmol of diethylaminodimethylsilane and a solution of chloroplatinic acid in isopropanol were added.

The chloroplatinic acid used herein was 0.25 mmol/mol relative to the hydrosilane compound.

Stirring was continued while maintaining the interior temperature at 90° C. One hour later, the reaction mixture was transferred to a blend tank and then the reaction mixture was transferred to a blend tank. As a stabilizer, BHT was added in an amount of 1 mass % relative to the polymer. The solvent was removed by a drum dryer for laboratory use to obtain a polymer.

The obtained polymer was designated as polymer L.
As a result of analysis of polymer L, the amount of bound styrene was 25 mass % and the amount of bound butadiene was 75 mass %. The Mooney viscosity at 100° C. was 62.

The amount of vinyl linkage (amount of 1,2-bonding) in the microstructure of the butadiene moiety obtained by calculation in accordance with the Hampton's method based on the measurement result by an infrared spectrophotometer was 52 mole %.

The modification ratio was 90%.
The glass transition temperature was −30° C.
The analysis results of polymer L were shown in Table 4.

TABLE 4

|  |  |  | Example 11 | Example 12 | Comparative Example 7 | Comparative Example 8 |
|---|---|---|---|---|---|---|
|  |  |  | Sample No. | | | |
|  |  |  | I | J | K | L |
| Production conditions | Initiator*4 | Type | NBL | HMI-Li | NBL | NBL |
|  |  | Amount to be used (mmol) | 13.0 | 13.0 | 7.9 | 13.0 |
|  | Modifier*5 | Type | AS-1 | AS-1 | DMAPTES | SiCL4 |
|  |  | Amount to be used (mmol) | 3.25 | 3.25 | 3.96 | 3.25 |
|  | Hydrosilyl compound *6 | Type | DEASiH | EOSiH | None | DEASiH |
|  |  | Amount to be used (mmol) | 52 | 26 | 0 | 26 |
| Analysis value | Mooney viscosity (100° C.) | | 60 | 65 | 58 | 62 |
|  | Amount of bound styrene (mass %) | | 25 | 25 | 25 | 25 |
|  | Amount of vinyl linkage (mole %) | | 52 | 52 | 53 | 52 |
|  | Modification ratio (mass %) | | 99 | 99 | 80 | 90 |
|  | Glass transition temperature (° C.) | | −30 | −30 | −29 | −30 |
|  | Molecular amount (Mn) ×10$^4$ | | 51 | 54 | 51 | 52 |
|  | Molecular amount distribution (Mw/Mn) | | 1.4 | 1.6 | 1.2 | 1.3 |
|  | Fraction of component having 3 or more branches (mass %) | | 85 | 85 | 5 | 88 |
|  | Block styrene (mass %) | | 0 | 0 | 0 | 0 |
|  | Ozone decomposition | Single-chain styrene (mass %) | 50 | 50 | 50 | 50 |
|  |  | Long-chain styrene (mass %) | 4 | 3 | 4 | 4 |

*4 to *6 in Table 4 will be described below.
*4 NBL normal butyllithium HMI-Li hexamethyleneiminolithium
*5 AS-1 2,2-dimethoxy-1-(3-trimethoxysilylpropyl)-1-aza-2-silacyclopentane DMAPTES 3-(dimethylamino)propyl-triethoxysilane SiCL4 silicon tetrachloride
*6 DEASiH diethylaminodimethylsilane EOSiH dimethylmonoethoxysilane Examples 13 and 14, Comparative Examples 9 and 10

Rubber compositions containing the respective raw material rubbers, polymers I to L obtained were obtained in accordance with the formulations shown below.

Formulation

Modified butadiene polymer (samples I to L): 100.0 parts by mass

Silica (Nipsil AQ manufactured by Tosho Silica Corporation): 75.0 parts by mass

Carbon black (SEAST KH (N339) manufactured by Tokai Carbon Co., Ltd.): 5.0 parts by mass Silane coupling agent (Si75 manufactured by Evonik Degussa GmbH): 6.0 parts by mass S-RAE oil (JOMO process NC140 manufactured by JX Nippon Oil & Energy Corporation): 30.0 parts by mass Wax (SUNNOC N manufactured by OUCHI SHINKO CHEMICAL INDUSTRIAL CO., LTD.): 1.5 parts by mass Zinc oxide: 2.5 parts by mass Stearic acid: 2.0 parts by mass Age resister (N-isopropyl-N'-phenyl-p-phenylenediamine): 2.0 parts by mass Sulfur: 1.8 parts by mass Vulcanizing accelerator (N-cyclohexyl-2-benzothiazylsulfin amide): 1.7 parts by mass Vulcanizing accelerator (diphenylguanidine): 2.0 parts by mass Total: 229.5 parts by mass The aforementioned materials were kneaded in accordance with the following method to obtain rubber compositions.

A raw material rubber, a filler (silica, carbon black), an organic silane coupling agent, process oil, zinc oxide and stearic acid were kneaded by using an airtight mixer (inner volume: 0.3 L) equipped with a temperature control unit, under the conditions of a first-stage kneading: a charge rate of 65% and rotor spinning number: 50/57 rpm. At this time, the temperature of the airtight mixer was controlled. A rubber composition was obtained at a discharge temperature (blend) of 155 to 160° C.

Subsequently, a second-stage kneading was performed. After the blend obtained above was cooled to room temperature, an age resister was added. The blend was kneaded again in order to improve dispersion of silica.

Also in this case, the discharge temperature (blend) was adjusted at 155 to 160° C. by controlling the temperature of the mixer. After cooling, sulfur and a vulcanizing accelerator were added and kneaded (third-stage kneading) by an open roll set at 70° C. Thereafter, the blend was molded and vulcanized by a vulcanization press at 160° C. for 20 minutes. After the vulcanization, the physical properties of the rubber compositions were measured.

The measurement results of the physical properties were shown in Table 5.

The physical properties of rubber compositions were measured by the following methods.

(1) Mooney Viscosity of Blend

A Mooney viscometer was used. After preheating was performed at 130° C. for one minute in accordance with JIS K6300-1 and then a rotor was rotated at a rate of two rotations per minute for 4 minutes, viscosity was measured. The results were indexed based on the results of Comparative Example 9 regarded as 100. The smaller the value, the better the processability.

(2) 300% Modulus and Tensile During Breakage

300% modulus and tensile during breakage were determined in accordance with the tension test method of JIS K6251 and indexed based on the results of Comparative Example 9 regarded as 100.

(3) Viscoelasticity Parameter

Viscoelasticity parameters were measured by a viscoelasticity tester (ARES) manufactured by Rheometric Scientific at a torsion mode. Individual measurement values were indexed based on the values of Comparative Example 9 regarded as 100.

Tan δ measured at 0° C., a frequency of 10 Hz and a strain of 1% was used as an indicator of wet skid resistance. The larger the value, the better the wet skid resistance.

Tan δ measured at 50° C., a frequency of 10 Hz and a strain of 3% was used as an indicator of fuel saving properties. The smaller the value, the better the fuel saving performance.

(4) Abrasion Resistance

Amount of abrasion was measured by an Akron abrasion tester (manufactured by Yasuda Seiki Seisakusho, Ltd.) at a load of 44.1 N and at a rotation of 1000 in accordance with JIS K6264-2 and indexed based on the value of Comparative Example 9 regarded as 100. The larger the index, the more excellent the abrasion resistance.

As shown in Table 4, it was confirmed that the modified conjugated diene polymer compositions of Examples 13 and 14, compared to the polymer compositions of Comparative Examples 9 and 10, have low tan δ at 50° C. (small hysteresis loss), which demonstrates low rolling-resistance of tire, and further have high tan δ at 0° C., which demonstrates excellent wet skid performance.

It was also confirmed that the rubber compositions of Examples 13 and 14 have sufficient processability (Mooney viscosity of a blend), abrasion resistance, 300% modulus and tensile during breakage in practice.

The present application is based on Japanese Patent Application No. 2011-184397 filed with the Japanese Patent Office on Aug. 26, 2011 and Japanese Patent Application No. 2011-229038 filed with the Japanese Patent Office on Oct. 18, 2011, the contents of which are incorporated herein by reference.

INDUSTRIAL APPLICABILITY

The method for producing a modified conjugated diene polymer of the present invention is industrially applicable as a technique for producing a modified conjugated diene polymer composition and a modified conjugated diene polymer constituting a rubber composition suitable for e.g., rubber for tire, vibration-proof rubber and rubber for footwear.

The invention claimed is:

1. A method of producing a modified conjugated diene polymer comprising a polymerization step of obtaining a conjugated diene polymer containing a nitrogen atom in a polymer chain and having an active end by copolymerizing a conjugated diene compound and a nitrogen atom-containing vinyl compound or a conjugated diene compound, an aromatic vinyl compound and a nitrogen atom-containing vinyl compound by use of an alkali metal compound and/or an alkaline earth metal compound as a polymerization initiator, and-

TABLE 5

| | | NO. | | | |
|---|---|---|---|---|---|
| | | Example 13 | Example 14 | Comparative Example 9 | Comparative Example 10 |
| | | Sample No. | | | |
| | | I | J | K | L |
| Blend | Mooney viscosity of blend (index) | 101 | 110 | 100 | 95 |
| Physical properties of rubber composition | 300% Modulus (index) | 105 | 110 | 100 | 100 |
| | Tensile during breakage (index) | 115 | 105 | 100 | 95 |
| | Abrasion resistance (index) | 130 | 150 | 100 | 90 |
| | 0° C. tanδ (strain 1%) (index) | 105 | 108 | 100 | 102 |
| | 50° C. tanδ (strain 3%) (index) | 70 | 71 | 100 | 95 | a modification step of reacting a modifier, which is a compound represented by the following formula (1), with the active end of the conjugated diene polymer:

[Formula 1]

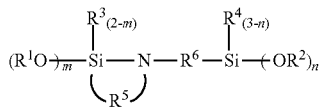

(1)

wherein $R^1$ to $R^4$ each independently represent an alkyl group having 1 to 20 carbon atoms or an aryl group having 6 to 20 carbon atoms; $R^5$ represents an alkylene group having 3 to 10 carbon atoms; $R^6$ represents an alkylene group having 1 to 20 carbon atoms; m is an integer of 1 or 2; and n is an integer of 2 or 3.

2. The method of producing the modified conjugated diene polymer according to claim 1, wherein an amount of the nitrogen atom-containing vinyl compound to be added is 0.5 to 100 moles based on 1 mole of the polymerization initiator.

3. The method of producing the modified conjugated diene polymer according to claim 1, wherein the nitrogen atom-containing vinyl compound is a compound represented by the following formula (2) or (3):

[Formula 2]

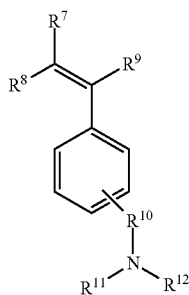

(2)

wherein $R^7$ to $R^9$ each independently represent hydrogen, an alkyl group having 1 to 20 carbon atoms or an aryl group having 6 to 20 carbon atoms; $R^{10}$ represents a single bond or a divalent hydrocarbon group having 1 to 6 carbon atoms, which may be interrupted by any of $NR^{13}$, O and S in the middle of the chain; and $R^{11}$ to $R^{13}$ each independently represent any selected from the group consisting of an alkyl group having 1 to 30 carbon atoms, an aryl group having 6 to 30 carbon atoms and a tri-substituted silyl group having an alkyl group having 1 to 30 carbon atoms and/or an aryl group having 6 to 30 carbon atoms on silicon;

[Formula 3]

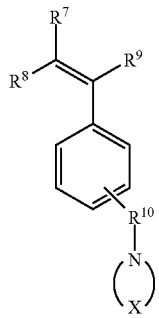

(3)

wherein $R^7$ to $R^{10}$ are the same as defined in the formula (2); X represents a divalent hydrocarbon group having 3 to 10 carbon atoms, which may be interrupted by any of $NR^{14}$, O and S in the middle of the chain and being a saturated ring forming portion in which all carbon-carbon bonds are single bonds or an unsaturated ring forming portion in which at least one of the carbon-carbon bonds is a double bond; and $R^{14}$ represents an alkyl group having 1 to 30 carbon atoms or an aryl group having 6 to 30 carbon atoms.

4. A modified conjugated diene copolymer obtained by the method of producing the modified conjugated diene polymer according to claim 1, wherein the modified conjugated diene polymer is modified from a conjugated diene polymer polymerized by copolymerizing a conjugated diene compound and a nitrogen atom-containing vinyl compound or a conjugated diene compound, an aromatic vinyl compound and a nitrogen atom-containing vinyl compound with a modifier, which is a compound represented by the following formula (1), with the active end of the conjugated diene polymer:

[Formula 1]

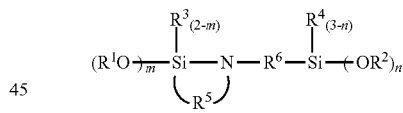

(1)

wherein $R^1$ to $R^4$ each independently represent an alkyl group having 1 to 20 carbon atoms or an aryl group having 6 to 20 carbon atoms; $R^5$ represents an alkylene group having 3 to 10 carbon atoms; $R^6$ represents an alkylene group having 1 to 20 carbon atoms; m is an integer of 1 or 2; and n is an integer of 2 or 3.

5. A method of producing a modified conjugated diene polymer comprising a polymerization step of obtaining a conjugated diene polymer having an active end by polymerizing a conjugated diene or copolymerizing a conjugated diene with a copolymerizable monomer by use of an alkali metal compound or an alkaline earth metal compound as a polymerization initiator, a modification step of modifying the active end by reacting a compound represented by the following formula (I) with the active end of the conjugated diene copolymer, and

[Formula 4]

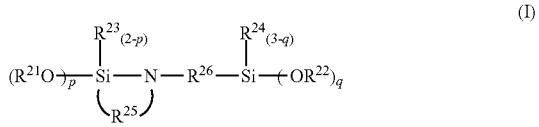
(I)

a step of modifying a vinyl group of a main chain of the conjugated diene polymer with a silicon modification group having at least one functional group selected from the group consisting of an amino group, an alkoxysilyl group and a hydroxy group by a hydrosilylation reaction:

where $R^{21}$ to $R^{24}$ each independently represent an alkyl group or aryl group having 1 to 20 carbon atoms; $R^{25}$ represents an alkylene group having 1 to 10 carbon atoms; $R^{26}$ represents an alkylene group having 1 to 20 carbon atoms; p is an integer of 1 or 2; and q is an integer of 2 or 3.

6. The method of producing the modified conjugated diene polymer according to claim 5, wherein the step of modifying a vinyl group of the main chain is a step of reacting a hydrosilane compound having at least one functional group selected from the group consisting of an amino group, an alkoxysilyl group and a hydroxy group with the conjugated diene polymer in the presence of a catalyst, after the active end is modified.

7. A modified conjugated diene polymer obtained by the production method according to claim 5, wherein a polystyrene-equivalent number average molecular weight (Mn) determined by gel permeation chromatographic (GPC) measurement is 20,000 to 2,000,000, and the modified conjugated diene polymer is modified from a conjugated diene polymer polymerized by polymerizing a conjugated diene or copolymerizing a conjugated diene with a copolymerizable monomer by modifying (i) an active end of the conjugated diene polymer by reacting a compound represented by the following formula (I) with the active end of the conjugated diene copolymer,

[Formula 4]

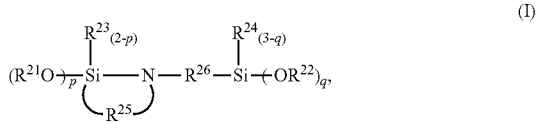
(I)

wherein $R^{21}$ to $R^{24}$ each independently represent an alkyl group or aryl group having 1 to 20 carbon atoms; $R^{25}$ represents an alkylene group having 1 to 10 carbon atoms; $R^{26}$ represents an alkylene group having 1 to 20 carbon atoms; p is an integer of 1 or 2; and q is an integer of 2 or 3, and (ii) a vinyl group of a main chain of the conjugated diene polymer with a silicon modification group having at least one functional group selected from the group consisting of an amino group, an alkoxysilyl group and a hydroxy group by a hydrosilylation reaction.

8. A modified conjugated diene polymer having a nitrogen atom-containing functional group in a main chain of the polymer, and a functional group having at least one secondary amino group, at least one alkoxysilyl group, and 3 to 6 branches on at least one of ends, wherein the modified conjugated diene polymer is modified from a conjugated diene polymer polymerized by copolymerizing a conjugated diene compound and a nitrogen atom-containing vinyl compound or a conjugated diene compound, an aromatic vinyl compound and a nitrogen atom-containing vinyl compound with a modifier, which is a compound represented by the following formula (1), with the active end of the conjugated diene polymer:

[Formula 1]

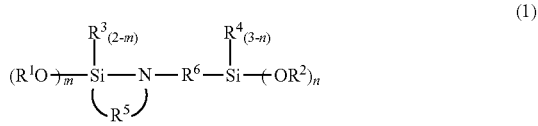
(1)

wherein $R^1$ to $R^4$ each independently represent an alkyl group having 1 to 20 carbon atoms or an aryl group having 6 to 20 carbon atoms; $R^5$ represents an alkylene group having 3 to 10 carbon atoms; $R^6$ represents an alkylene group having 1 to 20 carbon atoms; m is an integer of 1 or 2; and n is an integer of 2 or 3.

9. A modified conjugated diene polymer composition comprising 0.5 to 300 parts by mass of a silica inorganic filler based on 100 parts by mass of a rubber component having 20 parts by mass or more of the modified conjugated diene polymer according to claim 4.

10. The modified conjugated diene polymer composition according to claim 9, comprising 5 to 200 parts by mass of the silica inorganic filler.

11. A modified conjugated diene polymer composition comprising 5 to 200 parts by mass of a filler, which is silica and/or carbon black, based on 100 parts by mass of a rubber component having 20 parts by mass or more of the modified conjugated diene polymer according to claim 4.

12. A rubber composition obtained by subjecting the modified conjugated diene polymer composition according to claim 9 to crosslinking.

13. A tire comprising the rubber composition according to claim 12.

14. A rubber composition obtained by subjecting the modified conjugated diene polymer composition according to claim 11 to crosslinking.

15. A tire comprising the rubber composition according to claim 14.

16. A modified conjugated diene polymer composition comprising 0.5 to 300 parts by mass of a silica inorganic filler based on 100 parts by mass of a rubber component having 20 parts by mass or more of the modified conjugated diene polymer according to claim 7.

17. A modified conjugated diene polymer composition comprising 0.5 to 300 parts by mass of a silica inorganic filler based on 100 parts by mass of a rubber component having 20 parts by mass or more of the modified conjugated diene polymer according to claim 8.

18. A modified conjugated diene polymer composition comprising 5 to 200 parts by mass of a filler, which is silica and/or carbon black, based on 100 parts by mass of a rubber component having 20 parts by mass or more of the modified conjugated diene polymer according to claim 7.

19. A modified conjugated diene polymer composition comprising
5 to 200 parts by mass of a filler, which is silica and/or carbon black, based on 100 parts by mass of a rubber component having 20 parts by mass or more of the modified conjugated diene polymer according to claim 8.

20. A modified conjugated diene polymer having a nitrogen atom-containing functional group in a main chain of the polymer, and a functional group having at least one secondary amino group, at least one alkoxysilyl group, and 3 to 6 branches on at least one of ends, wherein
the modified conjugated diene polymer is modified from a conjugated diene polymer polymerized by polymerizing a conjugated diene or copolymerizing a conjugated diene with a copolymerizable monomer by modifying (i) an active end of the conjugated diene polymer by reacting a compound represented by the following formula (I) with the active end of the conjugated diene copolymer,

[Formula 4]

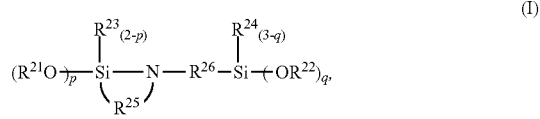

wherein $R^{21}$ to $R^{24}$ each independently represent an alkyl group or aryl group having 1 to 20 carbon atoms; $R^{25}$ represents an alkylene group having 1 to 10 carbon atoms; $R^{26}$ represents an alkylene group having 1 to 20 carbon atoms; p is an integer of 1 or 2; and q is an integer of 2 or 3, and (ii) a vinyl group of a main chain of the conjugated diene polymer with a silicon modification group having at least one functional group selected from the group consisting of an amino group, an alkoxysilyl group and a hydroxy group by a hydrosilylation reaction.

* * * * *